United States Patent
Lane

(10) Patent No.: US 11,017,353 B2
(45) Date of Patent: May 25, 2021

(54) MULTI-USER SOFTWARE-IMPEMENTED AUDIO COLLABORATION METHOD

(71) Applicant: Curtis Lane, Hollywood, FL (US)

(72) Inventor: Curtis Lane, Hollywood, FL (US)

( * ) Notice: Subject to any disclaimer, the term of this patent is extended or adjusted under 35 U.S.C. 154(b) by 0 days.

(21) Appl. No.: 16/418,482

(22) Filed: May 21, 2019

(65) Prior Publication Data

US 2020/0372468 A1 Nov. 26, 2020

(51) Int. Cl.
*G06Q 10/10* (2012.01)
*G06Q 30/02* (2012.01)
*H04R 3/04* (2006.01)
*H04L 29/06* (2006.01)
*G06F 3/16* (2006.01)

(52) U.S. Cl.
CPC .......... *G06Q 10/101* (2013.01); *G06F 3/165* (2013.01); *G06Q 30/0239* (2013.01); *H04L 63/083* (2013.01); *H04L 63/102* (2013.01); *H04R 3/04* (2013.01)

(58) Field of Classification Search
CPC ... G06Q 10/101; H04L 63/102; H04L 63/083; G06F 3/165
See application file for complete search history.

(56) References Cited

U.S. PATENT DOCUMENTS

| | | | | |
|---|---|---|---|---|
| 7,162,433 B1* | 1/2007 | Foroutan | ........ | G06Q 10/063114 705/7.42 |
| 2004/0139025 A1* | 7/2004 | Coleman | ............ | G06F 21/6254 705/51 |
| 2007/0282844 A1* | 12/2007 | Kim | ....................... | G06F 16/685 |
| 2010/0319518 A1* | 12/2010 | Mehta | .................. | G10H 1/0058 84/625 |
| 2014/0337420 A1* | 11/2014 | Wentzloff | ............ | H04N 21/274 709/204 |
| 2015/0020153 A1* | 1/2015 | Jang | ........................ | G06F 21/10 726/1 |
| 2015/0066655 A1* | 3/2015 | Leedman | ........... | G06Q 30/0272 705/14.68 |

(Continued)

FOREIGN PATENT DOCUMENTS

CA   2338674 A1 *  8/2002  ............. G06Q 10/10

*Primary Examiner* — Raquel Alvarez
(74) *Attorney, Agent, or Firm* — Mark C. Johnson; Johnson Dalal

(57) ABSTRACT

A multi-user software-implemented audio collaboration method allows a track producing user, at least one recording artist, and public listening users to produce, collaborate, and consume unique musical compositions with no fees and costs. The method allows the track producing user and recording artist user to collaborate on the production of a unique musical composition, and then store the musical composition as a working digital audio file on an administrator server. The method also allows public listening users to consume the musical composition for free by viewing a third-party advertisement to accumulate viewing credits. The public listening users convert the viewing credits to access the musical composition for storage in a personal musical library. The track producing user and the recording artist user receive a creator credit when the public listening users stores the musical composition in the music library. All the users communicate with each other through messaging.

16 Claims, 20 Drawing Sheets

(56) References Cited

U.S. PATENT DOCUMENTS

| | | | |
|---|---|---|---|
| 2015/0170179 A1* | 6/2015 | Burroughs | G06Q 30/0222 |
| | | | 705/14.23 |
| 2016/0261676 A1* | 9/2016 | Nishimoto | G06Q 30/06 |
| 2018/0041571 A1* | 2/2018 | Rogers | G06F 21/10 |
| 2018/0204236 A1* | 7/2018 | Morgan | G06Q 30/0214 |

* cited by examiner

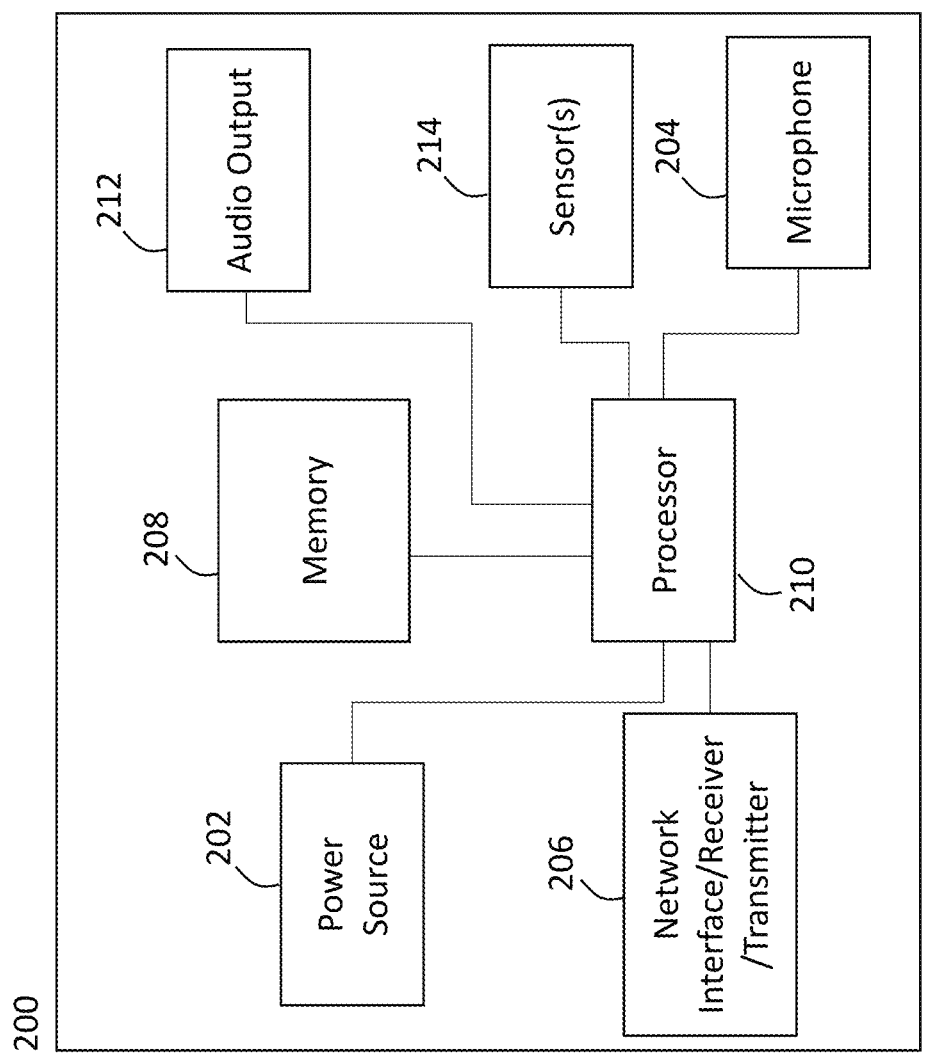

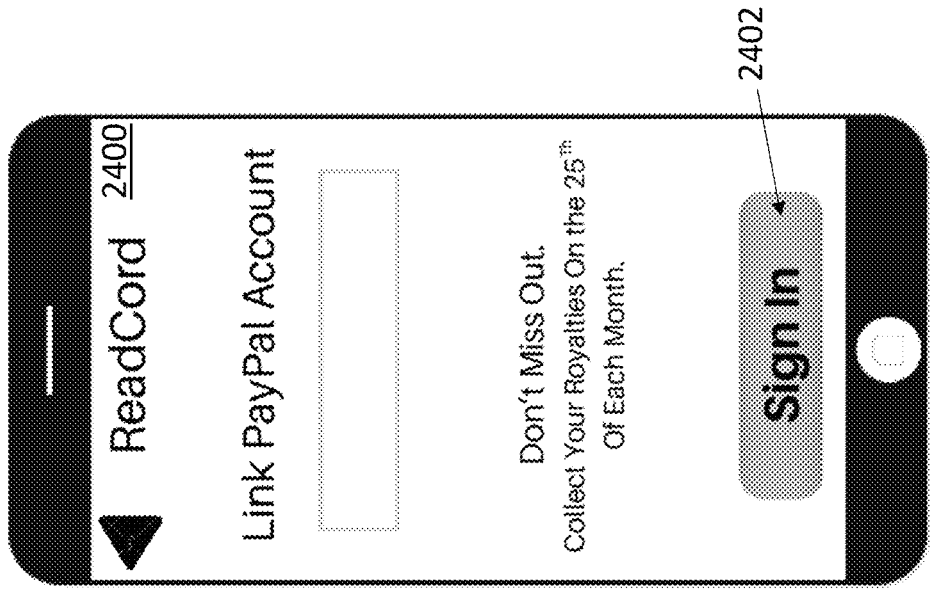
FIG. 24
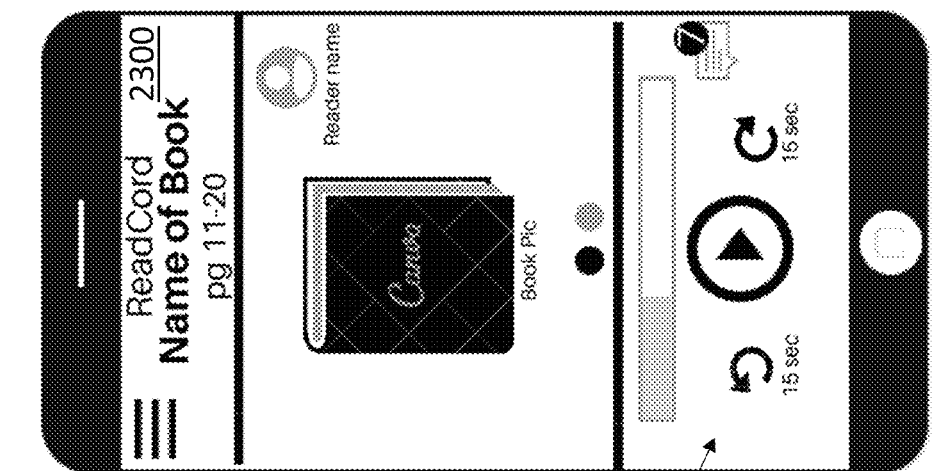
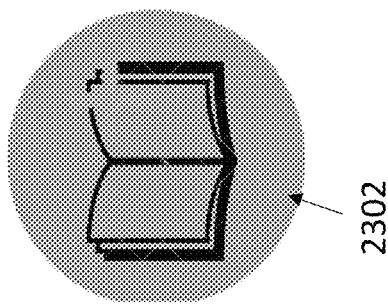
FIG. 23

MULTI-USER SOFTWARE-IMPEMENTED
AUDIO COLLABORATION METHOD

FIELD OF THE INVENTION

The present invention relates audio collaboration methods and systems and, more particularly, relates to a multi-user software-implemented audio collaboration method and system.

BACKGROUND OF THE INVENTION

Typically, musical compositions and instrumentations are recorded in a studio for public consumption. The use of digital audio music has created a revolution in the quality of sound available for home users and for radio stations nationwide. The music studios include sound recording rooms where the musician generates live music in solo or in groups; and in which the equipment records the music in separate tracks with or without electronic special effects. The tracks may then be mixed with one or more prerecorded tracks for final editing. In this manner, a single musician can perform against the tracks or in a virgin environment with new material. However, it is often difficult for the musician and the music producer to work together, especially when in different geographical locations.

To prepare the musician's audio files for consumption, the music is reconfigured through audio electronics and software that includes synthesizers, sequencers, and digital signal processors. These audio equipment and tools work together to create, emulate, and control the music production process. Often, a music producer oversees such productions. The final users may consume the music through radio, CD's. or by downloading the music. However, this can be expensive to purchase select music compositions.

Therefore, a need exists to overcome the problems with the prior art as discussed above.

SUMMARY OF THE INVENTION

The invention provides a multi-user software-implemented audio collaboration method and system that overcomes the hereinafore-mentioned disadvantages of the heretofore-known devices and methods of this general type and that allows a track producing user, at least one recording artist, and a plurality of public listening users to produce, collaborate, and consume unique musical compositions with no fees and costs. The method allows a track producing user and at least one recording artist user to collaborate on the production of a unique musical composition, and then store the musical composition as a working digital audio file on an administrator server.

The method also allows public listening users to consume the musical composition for free by viewing a third-party advertisement to accumulate viewing credits. The public listening users convert the viewing credits to access the musical composition for storage in a personal musical library. The track producing user and the recording artist user receive a creator credit when the public listening users stores the musical composition in the music library. All users can communicate with each other, i.e., comments, likes, through messaging means.

With the foregoing and other objects in view, there is provided, in accordance with the invention, a multi-user software-implemented musical collaboration method comprising an initial Step of providing an administrator server with a memory, the server communicatively coupled to a music collaboration network.

The method also includes a Step of providing an electronic device of a track producing user communicatively coupled to the server over the music collaboration network.

In some embodiments, a Step includes providing an electronic recording device of a first recording artist user communicatively coupled to the server over the music collaboration network and having an audio input, the first recording artist user geographically displaced with respect to the track producing user.

Another Step comprises providing an electronic device of a plurality of the public listening users communicatively coupled to the server over the music collaboration network.

The method also includes a Step of receiving and storing, at and on the memory of the administrator server, a working digital audio file of a unique musical composition from the electronic device of the track producing user 108 and recorded by the track producing user, the working digital audio file of a plurality of digital audio files resident on the memory of the administrator server.

Another Step comprises assigning the working digital audio file with a unique audio file tag and associating the unique audio file tag with an account of the track producing user.

The method also includes a Step of receiving and storing, at and on the memory of the administrator server, the working digital audio file with a first digital audio overlay from the first recording artist user to generate a collaboration working digital audio file, the first digital audio overlay of unique articulate vocals received by the audio input of, and recorded by, the electronic recording device of the first recording artist user.

A Step includes assigning the working digital audio file with the first digital audio overlay to the unique audio file tag and associating the unique audio file tag with an account of the first recording artist user.

In some embodiments, a Step comprises publishing, over the music collaboration network and on a user interface publicly available and accessible by a plurality of public listening users, an audial link to the collaboration working digital audio file.

A Step comprises assigning a creator credit to the accounts of the track producing user and the first recording artist user when the audial link to the collaboration working digital audio file is accessed by one of the plurality of public listening users and added to a music library associated with one of the plurality of public listening users.

The method may also include another Step of requiring the plurality of public listening users to login into a public user account and providing, after login into the public user account and viewing a third-party advertisement, a viewing credit to at least one of the plurality of public listening users, wherein a pre-set accumulation of at least one of a plurality of the viewing credits enables the at least one of the plurality of public listening users to access the audial link to the collaboration working digital audio file and add the collaboration working digital audio file to the music library associated with the at least one of the plurality of public listening users.

In accordance with another feature, an embodiment of the present invention also includes a Step of requiring the plurality of public listening users to view a substantial portion of the third-party advertisement as a requirement to receive the viewing credit.

In accordance with yet another feature, an embodiment of the present invention includes a Step of associating a payment vehicle to the track producing user and the first recording artist user, whereby the creator credit is autonomously assigned to the accounts of the track producing user and the first recording artist user through the payment vehicle.

In accordance with a further feature of the present invention, the creator credit is assigned autonomously to the accounts of the track producing user and the first recording artist user.

In accordance with another feature, an embodiment of the present invention also includes a Step of providing a vocal filtering user interface on the electronic recording device of the first recording artist user, the vocal filtering user interface operably configured to enable a voice filtering program to modulate the first digital audio overlay from the first recording artist user.

In accordance with yet another feature, an embodiment of the present invention includes a Step of providing an electronic recording device of a second recording artist user, different than the first recording artist user, communicatively coupled to the server over the music collaboration network and having an audio input, the second recording artist user geographically displaced with respect to the track producing user and the first recording artist user.

In accordance with a further feature of the present invention, a Step comprises receiving and storing, at and on the memory of the administrator server, the collaboration working digital audio file with a second digital audio overlay from the second recording artist user, the second digital audio overlay of unique articulate vocals received by the audio input of, and recorded by, the electronic recording device of the second recording artist user.

In accordance with another feature, an embodiment of the present invention also includes a Step of assigning the working digital audio file with the first and second digital audio overlays to the unique audio file tag and associating the unique audio file tag with an account of the second recording artist user.

In accordance with yet another feature, an embodiment of the present invention includes a Step of assigning the creator credit to the accounts of the track producing user, the first recording artist user, and the first recording artist user.

In accordance with another embodiment, the unique musical composition is an instrumental without lyrics or singing.

In accordance with a further feature of the present invention, a Step comprises requiring the track producing user and first recording artist user to login into a password-protected account, thereby creating a selectively closed music collaboration network.

In accordance with a further feature of the present invention, a Step comprises transmitting, by the plurality of public listening users, a message to the track producing user, or the first recording artist user, or both, the message being pertinent to the unique musical composition.

In accordance with a further feature of the present invention, a Step comprises responding, by the track producing user, or the first recording artist user, or both, to the message.

In accordance with another feature, an embodiment of the present invention also includes a Step of warning the plurality of public listening users about a controversial element of the accessed audial link.

In accordance with a further feature of the present invention, a Step comprises displaying, by a third-party advertiser, the third-party advertisement to the plurality of public listening users.

In accordance with a further feature of the present invention, a Step comprises assigning, by the third-party advertiser, the creator credit to the accounts of the track producing user and the first recording artist user when the audial link to the collaboration working digital audio file is accessed by one of the plurality of public listening users and added to the music library associated with one of the plurality of public listening users.

Although the invention is illustrated and described herein as embodied in a multi-user software-implemented audio collaboration method, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 2 is a block diagram of an exemplary audio communication system for operation of the multi-user software-implemented audio collaboration system, in accordance with the present invention;

FIG. 23 is a screen shot view for a multi-user software-implemented text collaboration method and system operable with a text medium, showing a reading users credit page, in accordance with the present invention;

FIG. 24 is a screen shot view for a multi-user software-implemented text collaboration method and system operable with a text medium, showing a payment vehicle page, in accordance with the present invention;

DETAILED DESCRIPTION

Figure 1:
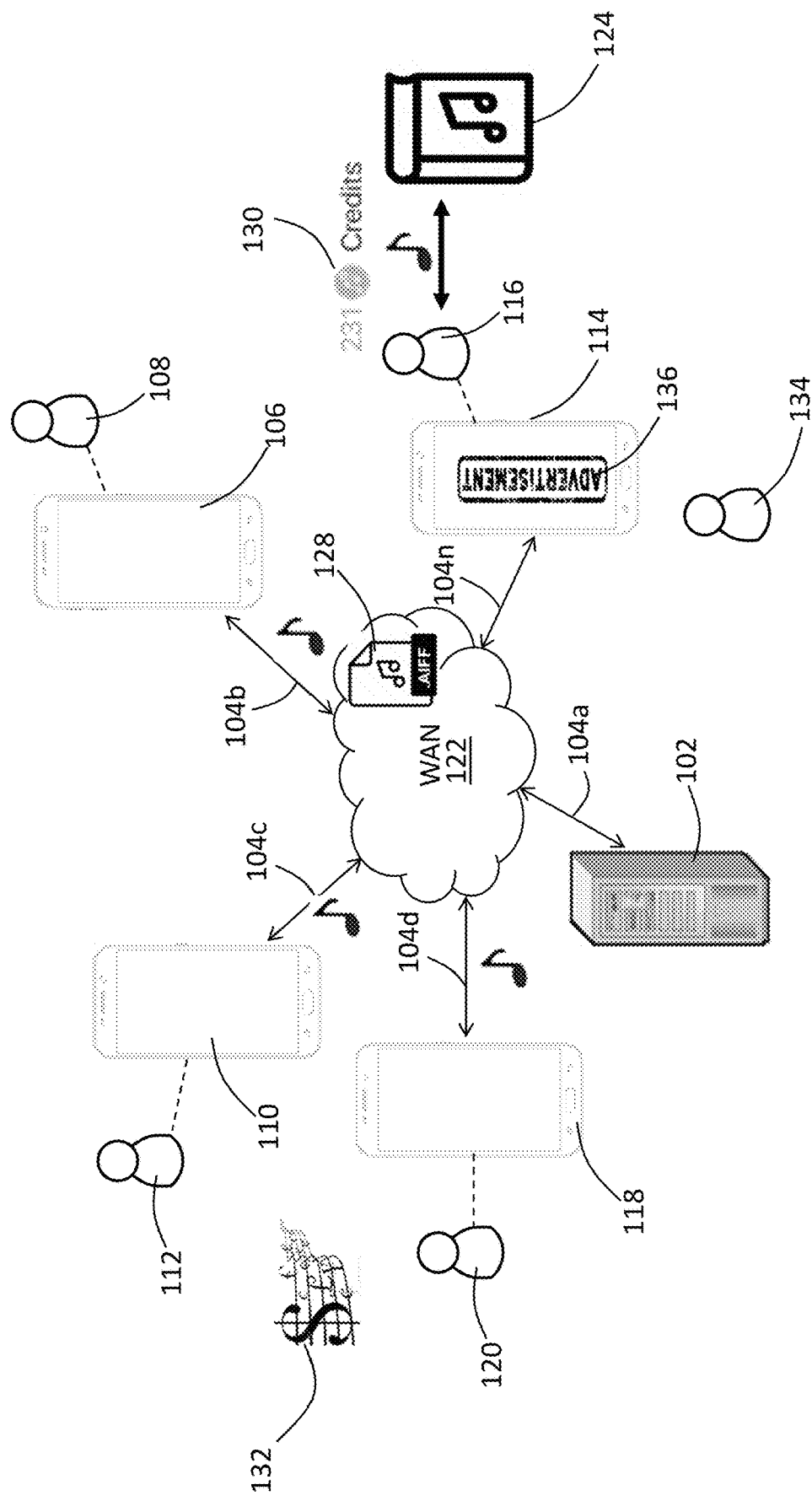
FIG. 1 is a block diagram of an exemplary multi-user software-implemented audio collaboration system, in accordance with the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient multi-user software-implemented audio collaboration method 300 and system 100. Embodiments of the invention provide a system 100 that combines the collaborative efforts of a track producing user 108 and at least one recording artist user 112, 120 to produce and distribute unique musical compositions 126 for consumption by a plurality of public listening users 116, and at no cost to any of the parties. In addition, embodiments of the invention generate funds are generated to pay the track producing user and the recording artist user from a third-party user 134 that provides third-party advertisements 136 viewable by the public listening users 116.

As referenced in the block diagram of FIG. 1, a multi-user software-implemented audio collaboration system 100, hereafter "system 100" is configured such that a track producing user, at least one recording artist, and a plurality of public listening users 116 can efficiently produce, collaborate, and consume at least one unique musical compositions, with no fees and costs to the parties.

The system 100 includes a music collaboration network 122 that connects the track producing user 108 and at least one recording artist user 112, 120 during collaboration on production of the unique musical compositions. The track producing user may collaborate with a single first recording artist 112, and an additional second recording artist user 120 to produce multiple musical compositions 126 on a track. The produced musical compositions are configured into a working digital audio file 128 that stores on an administrator server 102. The plurality of public listening users 116 who access the music collaboration network 122 can also access the musical compositions from the administrator server 102.

Continuing with the system 100, the public listening users 116 access the administrator server 102 to view and consume the musical composition. The public listening users 116 can comment on the musical compositions, communicating with the track producing user 108, and the recording artist user 112, 120. During consumption of the musical composition 126, a warning is transmitted to the public listening users 116 to indicate a controversial element in the musical composition, such as explicit language.

By viewing a third-party advertisement 136, which may be auditory and/or video-based, the public listening users 116 do not pay a fee to access and consume the musical composition 126. Thus, as the public listening user 116 views a substantial portion of the third-party advertisements accumulate, the public listening user accumulates a viewing credit 130. The viewing credit 130 of the public listening user is convertible to public user permission to store the desired musical composition in a personal musical library 124. The track producing user 108 and the recording artist users 112, 120 receive a creator credit 132, such as a royalty, when the public listening users 116 storing the musical composition in the music library 124. The track producing user, recording artists, and public listening users 116 communicate with each other through messages over the music collaboration network 122.

FIG. 2 is a block diagram of an exemplary audio communication system 200 for operation of the multi-user software-implemented audio collaboration system 100. In this embodiment, the technical components that make the system 100 operable include audio components that allow for production and listening of the musical compositions 126 in the form of a working digital audio file 128. In one embodiment, the electronic recording devices 106, 110 of the tracks producing user 108 and the first recording artist user 112 include a microphone 204 that captures the collaborative efforts of recording the musical composition. A sensor 214 detects the audio input and begins recording the audio.

Continuing with the system 200, a processor 210 works to process, i.e., mix, balance, amplify the audio signals for optimal listening. This can be useful for effective music distribution. The processor is also effective for voice filtering, such as auto tune, deep voice, and vocal dubbing. A memory 208 stores the working digital audio file 128. The produced musical compositions are configured into a working digital audio file 128 that stores on an administrator server 102. The public listening users 116 who access a music collaboration network 206 can also access the musical compositions from the administrator server 102. Additionally, a power source 202 may be used to power the audio components.

Figure 3A:
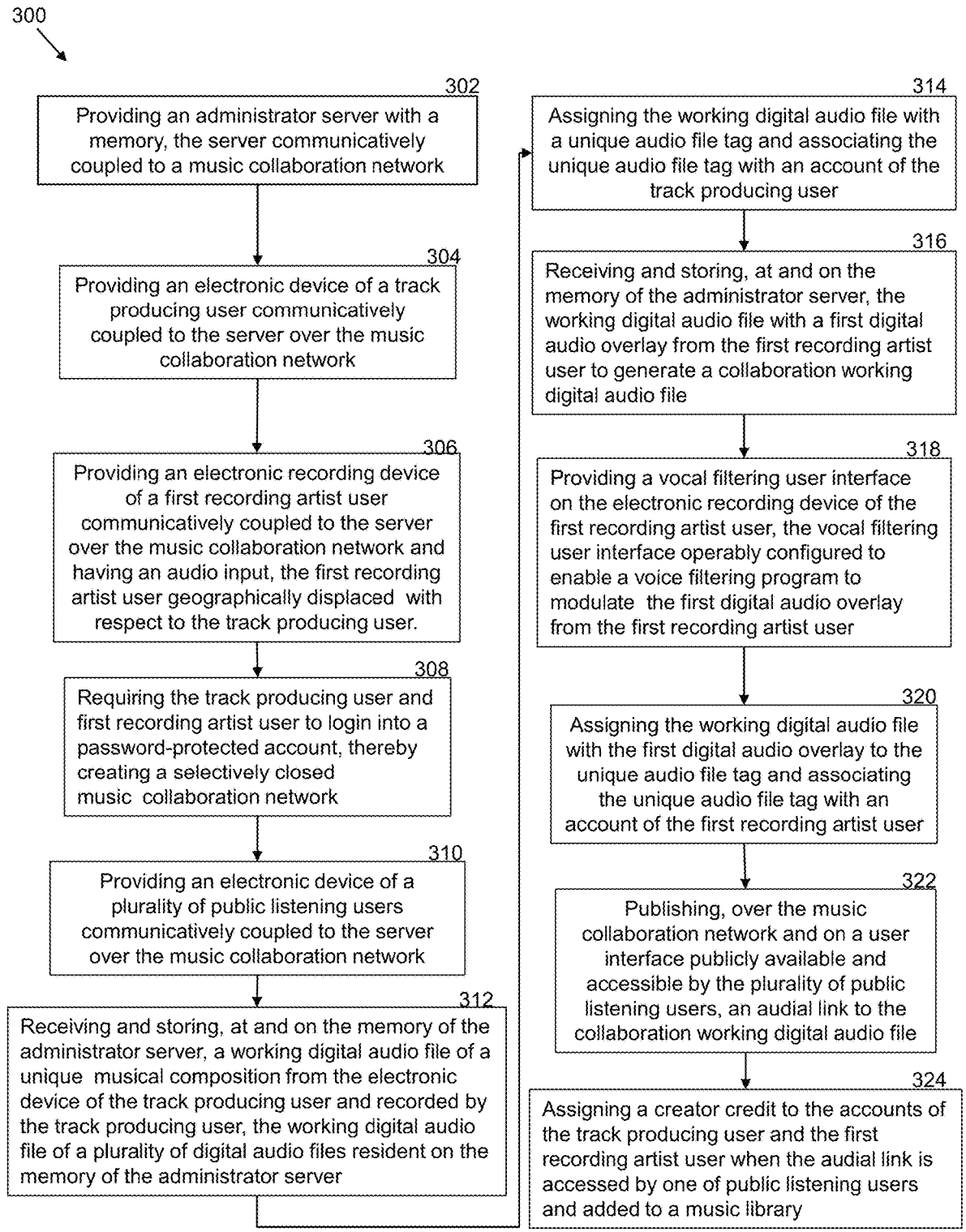
FIGS. 3A-3B are flowchart diagrams of an exemplary multi-user software-implemented audio collaboration method, in accordance with the present invention.
Figure 3B:
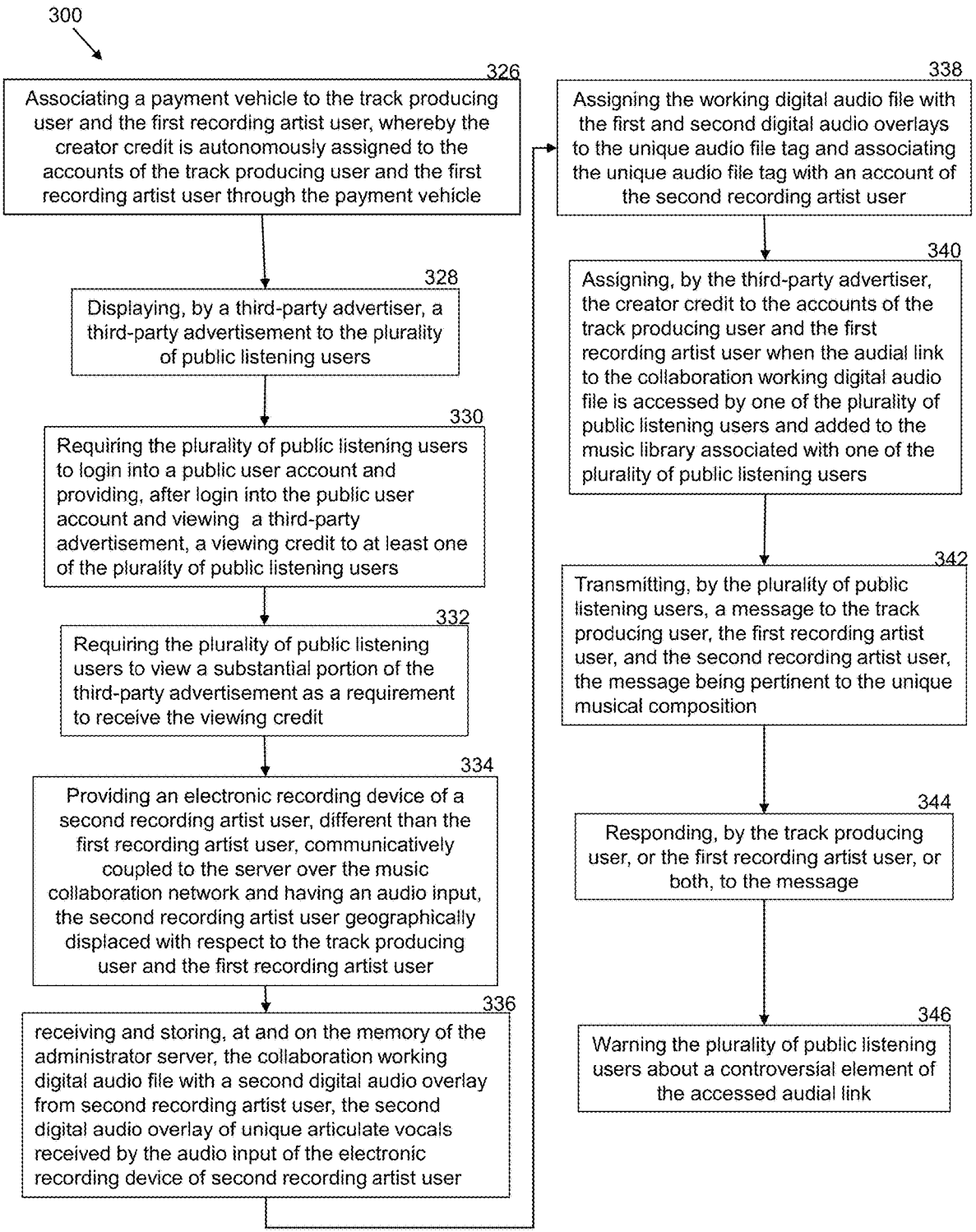

FIGS. 3A-3B will be described in conjunction with the process flow chart for the multi-user software-implemented audio collaboration method 300. Although FIGS. 3A-3B shows a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIGS. 3A-3B for the sake of brevity. In some embodiments, some or all of the process steps included in FIGS. 3A-3B can be combined into a single process.

The method 300 may include an initial Step 302 of providing an administrator server 102 with a memory, the server communicatively coupled 104a to a music collaboration network 122. The administrator server 102 may be defined as a central server overseeing smaller servers in the system 100. The music collaboration network 122 can include a network of musicians, producers, and public music consumers that mutually benefit from the music collaboration network 122. The music collaboration network 122 may be accessible through registration, passwords, and other selectively closed means known in the art, as described below.

Figure 4:
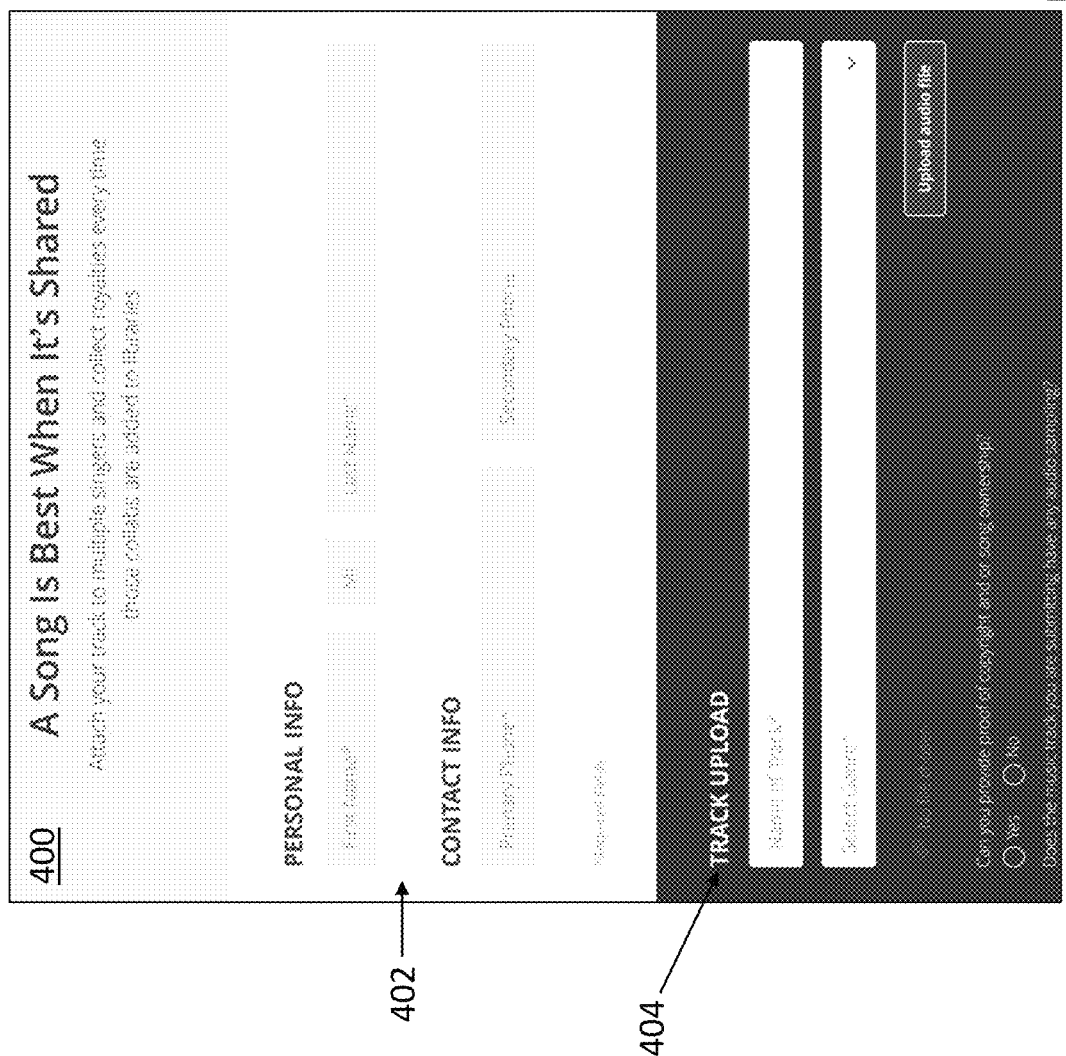
FIG. 4 is a screen shot view of an electronic device of a user, in accordance with the present invention.

The method 300 may further comprise a Step 304 of providing an electronic device 106 of a track producing user 108 communicatively coupled to the server over the music collaboration network 122. As FIG. 4 shows, the electronic device 106 may include, without limitation, a smart phone, a radio, a laptop, a tablet, and a computer. The electronic device may also include synthesizers, sequencers, and digital signal processors for enhancing audio files.

In one possible embodiment, the electronic device 106 has a downloadable app that provides a user interface (UI), including screenshots for maneuvering through the different functions and features offered by the method 300. The UI provides various pages and dialogue boxes that help in the recording, enhancing, publishing, assigning, and consumption of the recorded musical compositions.

Through the downloadable app on the electronic device 106, the track producing user 108 can sign in at a sign-in page 400 to oversee and manage the sound recording and production of at least one sound recording artist 112, 120 for purposes of generating a unique musical composition 126 on a track. The sign-in page 400 includes a user input portion 402 in which the users 108, 112, 120 can input name, email, password, and other identifying data. Further, the sign-in page 400 may also include a track upload portion 404 through which the track producing user 108 and/or first recording artist user 112 may upload musical compositions, as described below.

A Step 306 includes providing an electronic recording device 110 of a first recording artist user 112 communicatively coupled to the server over the music collaboration network 122 and having an audio input, the first recording artist user 112 geographically displaced with respect to the track producing user 108. The first recording artist user 112 can remotely work with the track producing user 108 to synthesize and enhance the musical composition. A single song, or multiple songs on a track may be produced. The tracks may then be mixed with one or more prerecorded tracks for final editing. In this manner, the first recording artist user 112 can perform against the tracks or in a virgin environment with new audio material.

The first recording artist user 112 is the party that records the media that is produced into a track and subsequently stored for consumption. Similar to the track producing user 108, the electronic device 110 for the first recording artist user 112 can be used for recording audio, and even production of audio files. The electronic device 110 may include, without limitation, a recording machine, a smart phone, a radio, a laptop, a tablet, and a computer.

The UI on the electronic device 110 displays a recording page 500. From the recording page 500, the first recording artist user 112 selects a record portion or icon 502 to begin recording the desired musical composition. i.e., music, instrumental. In this manner, the audio can be recorded and saved as an audio file known in the art. Also, in the recording page 500 is a music title portion 504 allows the first recording artist user 112 to input the title of the musical composition being recorded.

Figure 6:
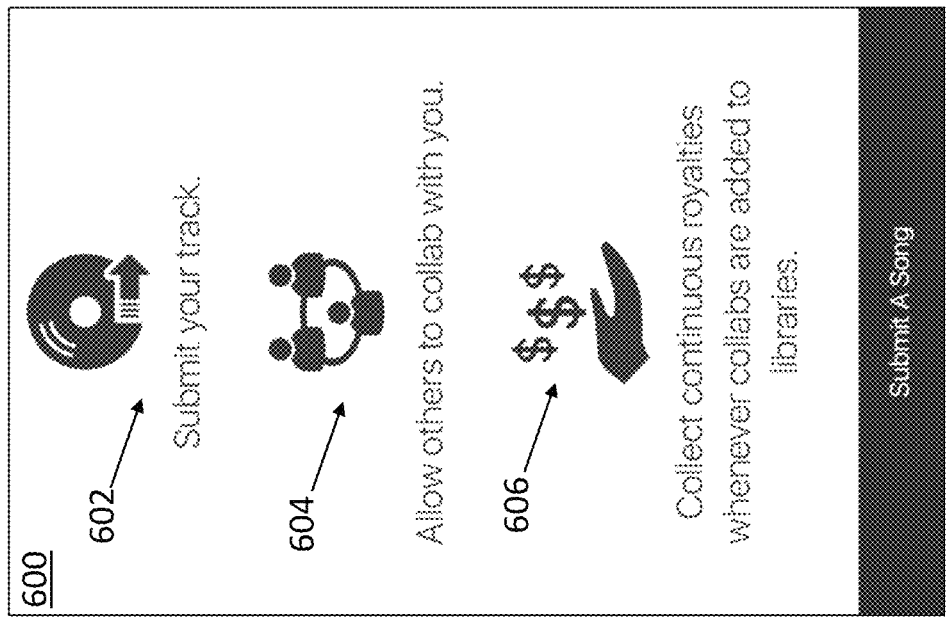
FIG. 6 is a screen shot view of a music upload screen, in accordance with the present invention.
Figure 5:
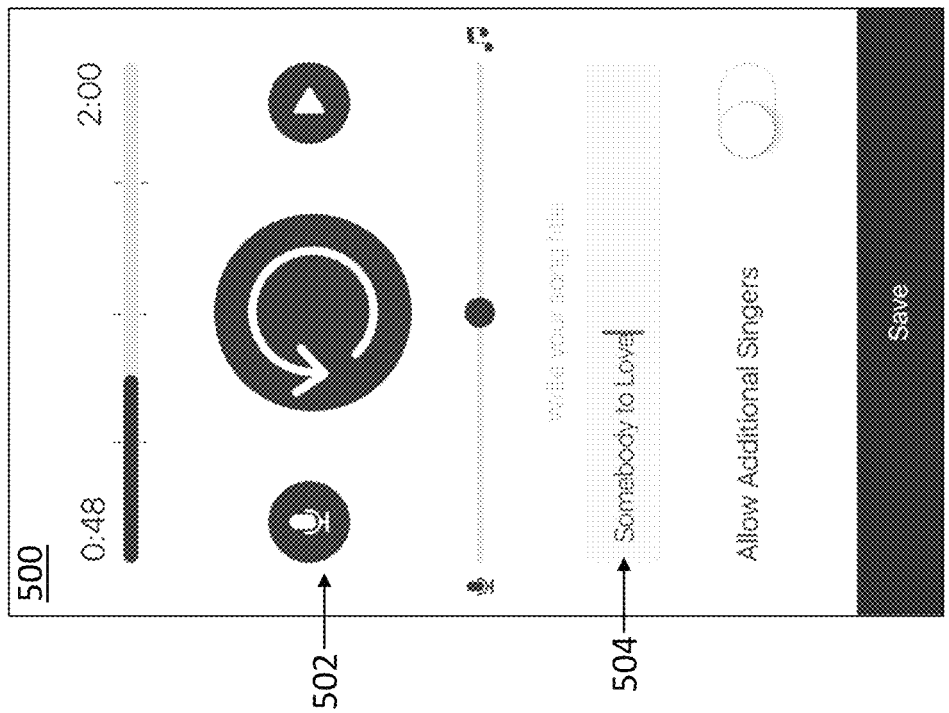
FIG. 5 is a screen shot view of a recording page, in accordance with the present invention.

As FIG. 6 references, the electronic device 110 displays a music upload screen 600 that allows the first recording artist user 112 to upload the recorded audio to the administrator server 102 for collaborative work on the music collaboration network 122 with the track producing user 108. From the music upload screen 600, the first recording artist user 112 selects a submit record portion 602 to upload the recorded audio file to the administrator server 102. In other embodiments, the track upload portion 404 described above may also be used to upload recorded musical compositions.

Continuing with the music upload screen 600, the first recording artist user 112 may then select a collaboration portion 604 to give permission to other users 108, 120 to collaborate on the musical composition. In one embodiment, copyright laws must be adhered to in order to produce the musical composition. In one non-limiting embodiment, the unique musical composition 126 is an instrumental with or without lyrics or singing. After the musical composition has been consumed, the first recording artist user 112 may also select a credit collection portion or icon 606 to collect creator credits 132, as discussed below.

The method 300 is unique in that the relative location of the parties is not relevant for operation. Thus, the geographical location of the first recording artist user 112, and the track producing user 108 may not be in the same physical location, i.e., studio, city. This does not affect the operation of the method 300. However in other embodiments, the relative geographical location may still be in the same city, country, state, etc. Further, the first recording artist user 112, and the track producing user 108 may have different IP addresses or MAC addresses when accessing the music collaboration network 122. In this scenario, the collaboration is still possible.

Looking again at FIG. 4, a Step 308 comprises requiring the track producing user 108 and first recording artist user 112 to login into a password-protected account through the user input portion 402. This sign-in feature creates a selectively closed music collaboration network 122. The music collaboration network 122 is selectively closed, as it may require account registration and password-protection in order to upload, record, or play the working digital audio file. In preferred embodiments, users 108, 112, 116, 120 are permitted to view the working digital audio file without having to create an account. Also, in preferred embodiments the user who wants to play the working digital audio file must enter the password.

Figure 7:
FIG. 7 is a screen shot view of a music list page, in accordance with the present invention.

A Step 310 comprises providing an electronic device 114 of a plurality of public listening users 116 communicatively coupled to the server over the music collaboration network 122. The public listening users 116 may include any member of the public who has an interest in listening or examining the stored musical composition, or track containing multiple musical compositions. The electronic device 114 may include, without limitation, a smart phone, a radio, a laptop, a tablet, and a computer. FIG. 7 references a music list page 700 on electronic device 114 that lists recorded and uploaded musical compositions and/or tracks 702 collaborated on by the track producing user 108 and the first recording artist user 112.

Figure 8:
FIG. 8 is a screen shot view of a musician identification page, in accordance with the present invention.

From the UI of the electronic device 114, a musician identification page 800 allows the public listening users 116 to view the first and second recording artist users 112, 120 and the correlating musical compositions 126 therefore (FIG. 8). This view on the musician identification page 800 can include an image 802 of the first recording artist user 112, and a quote or message 804 by the first recording artist user 112. For example, "When I ask you to listen to a song, it's because the lyrics mean everything I'm trying to say to you." This can help build an emotional bond to the first recording artist user 112. Further, the musician identification page 800 can include a musician list 806 of other recording artist users registered to the music collaboration network 122.

All of the users, including the public listening users 116 have access to the musical composition 126 through a Step 312 that includes receiving and storing, at and on the memory of the administrator server 102, a working digital audio file 128 of a unique musical composition 126 from the electronic device 106 of the track producing user 108 and recorded by the track producing user 108, the working digital audio file 128 of a plurality of digital audio files resident on the memory of the administrator server 102.

In one non-limiting embodiment, the unique musical composition 126 is an instrumental without lyrics or singing. The lyrics may include inarticulate vocals, such as shouted backup vocals in a Big Band setting. The term "unique" as defined for musical composition, is relative to other digital musical tracks stored on the server. However, as numerous musical compositions in the same genre accumulatively store in the music collaboration network 122, similar musical compositions and tracks may be available for consumption by the public listening users 116.

In some embodiments, a Step 314 may include assigning the working digital audio file 128 with a unique audio file tag and associating the unique audio file tag with an account of the track producing user 108. This tag-association helps assign the recording artist with the corresponding musical composition or track. A Step 316 comprises receiving and storing, at and on the memory of the administrator server 102, the working digital audio file 128 with a first digital audio overlay from the first recording artist user 112 to generate a collaboration working digital audio file, the first digital audio overlay of unique articulate vocals received by the audio input of, and recorded by, the electronic recording device 110 of the first recording artist user 112.

The algorithm for accessing the network 122, and publishing, assigning, collaborating, and accessing the audio files for consumption; along with the various messaging, payment, and crediting functions of the system 100 and method 300 are operable with an algorithm referenced in an APPENDIX A. Furthermore, those skilled in the art will recognize that the technical operation of the first digital audio overlay of working digital audio files 128 is incorporate by reference, e.g., U.S. Pat. Nos. 6,410,837, 6,490,359, 8,612,035, U.S. Patent Application Publication No. 2004/0220814, U.S. Patent Application Publication No. 2004/0264715, U.S. Patent Application Publication No. 2004/0163980.

Figure 9:
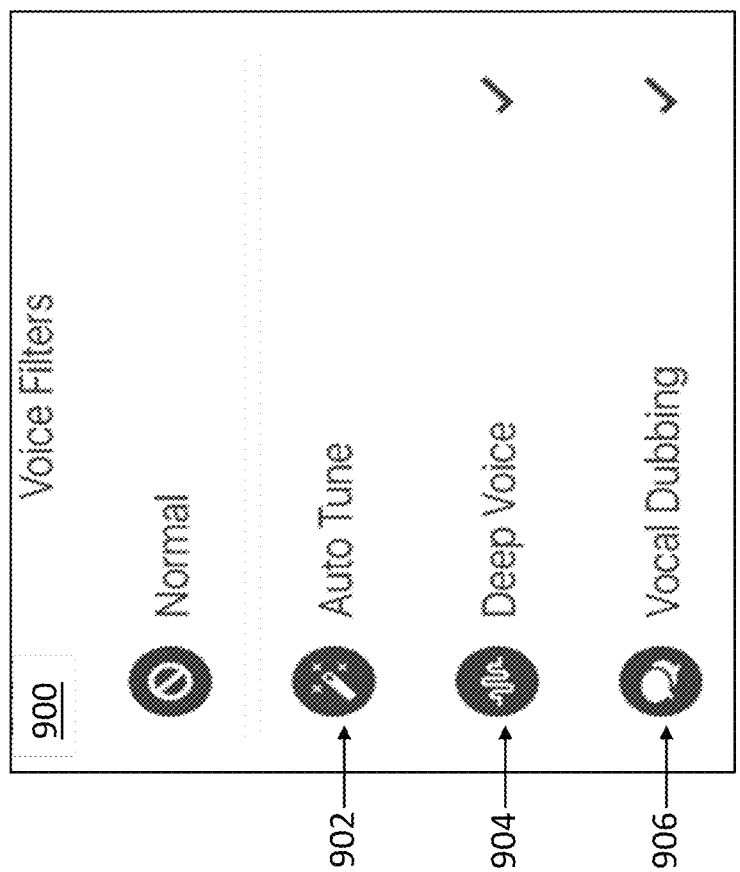
FIG. 9 is a screen shot view of a vocal filtering user interface, in accordance with the present invention.

Looking now at FIG. 9, the method 300 may further comprise a Step 318 of providing a vocal filtering user interface 900 on the electronic recording device 110 of the first recording artist user 112, the vocal filtering user interface operably configured to enable a voice filtering program to modulate the first digital audio overlay from the first recording artist user 112. The vocal filtering user interface 900 allows the first recording artist user 112 to enhance the quality sound from the electronic recording device, and not require expensive audio equipment. In some embodiments, the audio modulation may include an auto tune feature 902, a deep voice feature 904, and a vocal dubbing feature 906.

The method 300 includes a Step 320 of assigning the working digital audio file with the first digital audio overlay to the unique audio file tag and associating the unique audio file tag with an account of the first recording artist user 112. Continuing with the method 300, a Step 322 includes publishing, over the music collaboration network 122 and on a user interface publicly available and accessible by the plurality of public listening users, an audial link to the collaboration working digital audio file. The assignment and publishing can be performed through the music upload screen 600.

Figure 10:
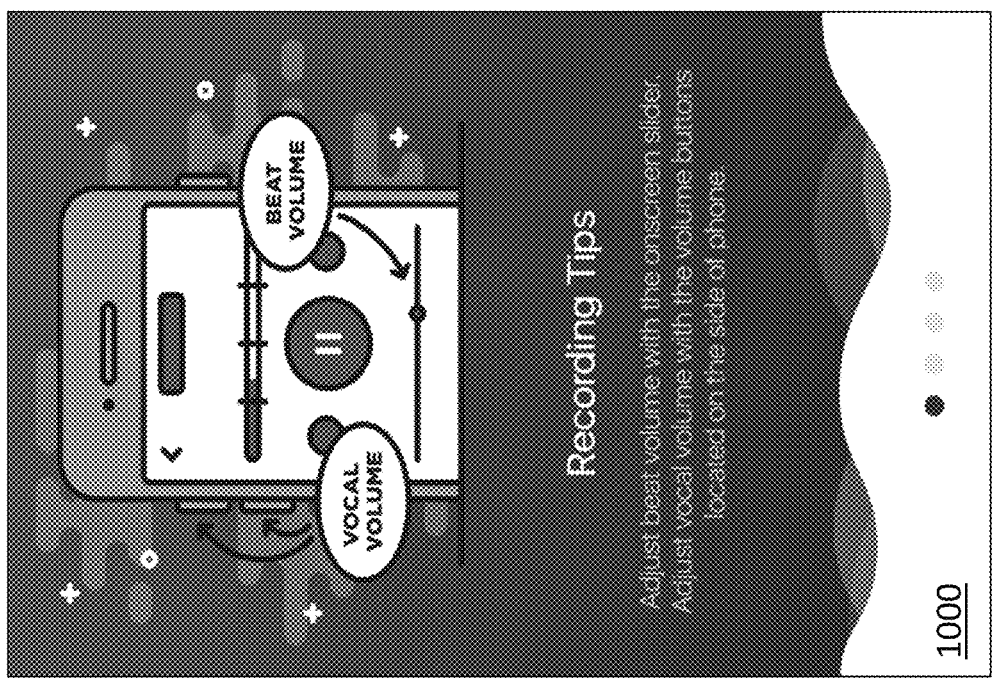
FIG. 10 is a screen shot view of a recording tips dialogue box, in accordance with the present invention.

It is also significant to note that before publishing, the method provides a recording tips dialogue box 1000 that provides the users 108, 112, 120 with tips and advice for enhancing the publication of the recorded musical composition. As shown in FIG. 10, the recording tips dialogue box 1000 may indicate how to adjust the volume with a slidable volume tab, and corresponding volume buttons located at the sides of the electronic devices 106, 110, 114, 118.

The method 300 may further comprise a Step 324 of assigning a creator credit to the accounts of the track producing user 108 and the first recording artist user 112 when the audial link to the collaboration working digital audio file is accessed by one of the plurality of public listening users and added to a music library 124 associated with one of the plurality of public listening users. The creator credit is assigned autonomously to the accounts of the track producing user 108 and the first recording artist user 112.

Figure 12:
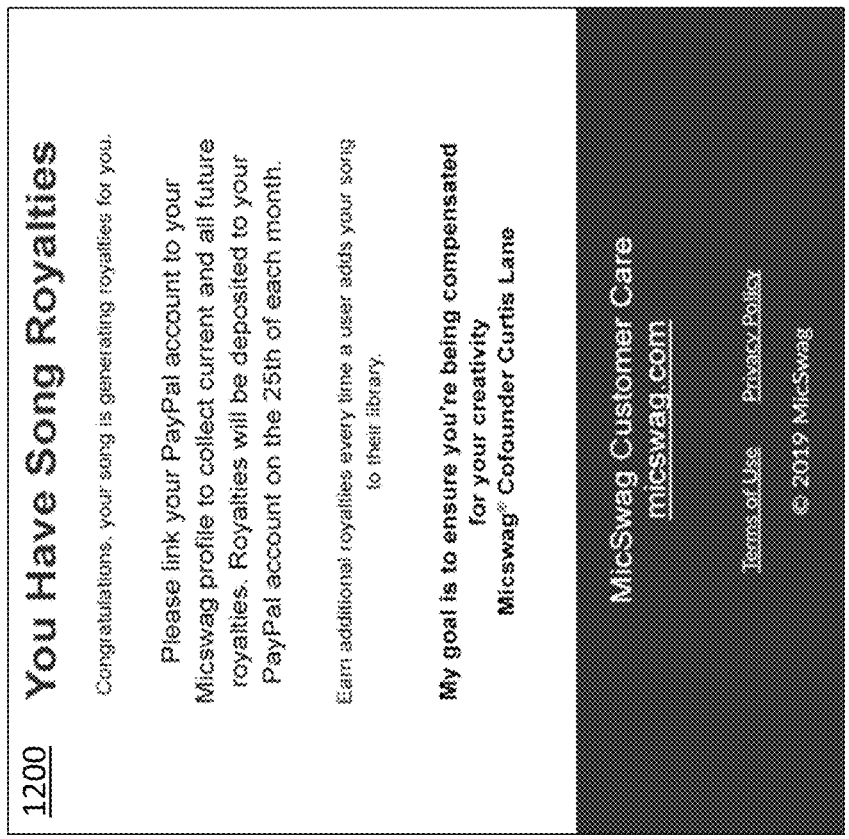
FIG. 12 is a screen shot view of a payment dialogue box, in accordance with the present invention.
Figure 11:
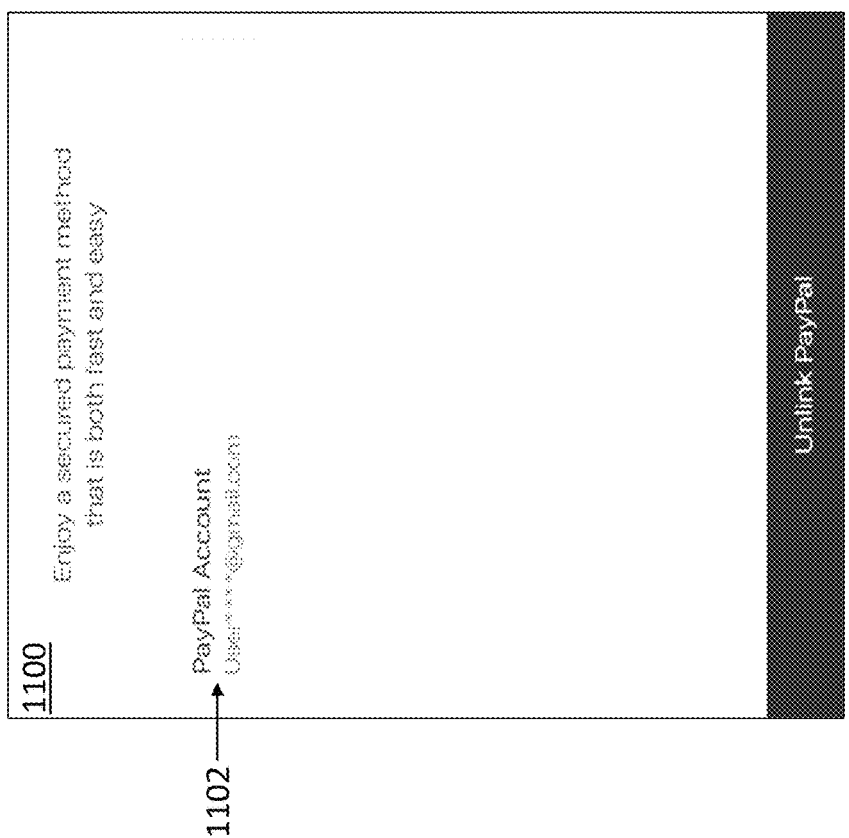
FIG. 11 is a screen shot view of a payment vehicle screen, in accordance with the present invention.

Turning now to FIG. 11, a Step 326 includes associating a payment vehicle to the track producing user 108 and the first recording artist user, whereby the creator credit is autonomously assigned to the accounts of the track producing user 108 and the first recording artist user through the payment vehicle. The UI displays a payment vehicle screen 1100 that requests a payment means to award the creator credit 132 to the accounts of the track producing user 108 and the first recording artist user 112. A payment vehicle sign in portion 1102 allows the users to accommodate this request by signing in to the payment vehicle. In one non-limiting embodiment, the payment vehicle may include PayPal™, or other online payment systems that support online money transfers and service. Further, a payment notification dialogue box 1200 automatically appears on the UI to indicate that creator credits 132 are available for transfer to the user's accounts through the payment vehicle (FIG. 12).

In one exemplary fiduciary function, the first recording artist user watches a video advertisement and collect song credits. When the first recording artist user collects six credits the user can then add any collaborated song to their personal library (FIG. 1). Furthermore, when a musical composition is added to a user's music library all users identified as contributors on the selected song will each receive a royalty of $0.05. Furthermore, the royalties automatically deposit into the users PayPal™ account on the 25th of each month. However, it is significant to note that the first recording artist user whose profile is not linked to a PayPal™ account receives an email notice for every royalty earned and receives full payout upon linking their PayPal™ account.

Continuing with the advertising model, A Step 328 comprises displaying, by a third-party advertiser, a third-party advertisement to the plurality of public listening users. This marketing component of the method 300 allows the publication and consumption of musical compositions to be free. The third-party advertiser 134 may include a business or organization that promotes music, musical instruments, and musical production equipment and services. The third-party advertiser 134 benefits, and pays a viewer credit 132 when the public listening users 116 view the directed third-party advertisement 136. In this manner, all aspects of the method 300 are free to all users, including no fee to download the app, no fee to upload the musical compositions, no fee to record a musical composition, no fee to distribute a created song, no fee to build a song library, and no subscription fees.

Continuing with the marketing aspect of the method, a Step 330 comprises requiring the plurality of public listening users to login into a public user account and providing, after login into the public user account and viewing a third-party advertisement 136, a viewing credit to at least one of the plurality of public listening users, wherein a pre-set accumulation of at least one of a plurality of the viewing credits enables the at least one of the plurality of public listening users to access the audial link to the collaboration working digital audio file and add the collaboration working digital audio file to the music library 124 associated with the at least one of the plurality of public listening users 112, 120.

In some embodiments, the third-party advertisement 136 may be a video, audio recording, image, text, or other marketing means known in the art. The public listening users 116 may view the third-party advertisement 136 to accumulate the viewing credit 130, as shown in FIG. 1. The viewing credit 130 may include digital depictions of credits. The public listening users 116 can convert the viewing credits 130 into permission to store the musical compositions 126 in the music library 124 for consumption. In one non-limiting embodiment, six viewing credits are required to store a musical composition in the music library 124. However in other embodiments, the amount of viewing credits may be more or less.

In some embodiments, a Step 332 comprises requiring the plurality of public listening users 116 to view a substantial portion of the third-party advertisement as a requirement to receive the viewing credit 130. In another embodiment, the public listening users 116 is required to finish the length of time for the advertisement. In one alternative embodiment, the longer that the public listening users 116 view the third-party advertisement 136, the more viewing credits are accumulated. This allows the third-party advertiser 134 to ensure that the advertisements are being consumed more fully.

A Step 334 comprises providing an electronic recording device 118 of a second recording artist user 120, different than the first recording artist user 112, communicatively coupled to the server 102 over the music collaboration network 122 and having an audio input, the second recording artist user 120 geographically displaced with respect to the track producing user 108 and the first recording artist user 112.

The recording, and access to the music collaboration network 122 for the second recording artist user 120 is substantially the same as the first recording artist user 112. However, the method 300 allows the first and second recording artist users 112, 120 to collaborate on a musical composition and/or a track. This may create a synergy between the recording artist users 112, 120 and the track producing user 108.

A Step 336 includes receiving and storing, at and on the memory of the administrator server 102, the collaboration working digital audio file with a second digital audio overlay from the second recording artist user 120, the second digital audio overlay of unique articulate vocals received by the audio input of, and recorded by, the electronic recording device 118 of the second recording artist user 120. In some embodiments, a Step 338 may include assigning the working digital audio file with the first and second digital audio overlays to the unique audio file tag and associating the unique audio file tag with an account of the second recording artist user.

The method may further comprise a Step 340 comprises assigning, by the third-party advertiser, the creator credit to the accounts of the track producing user 108 and the first recording artist user 112 when the audial link to the collaboration working digital audio file is accessed by one of the plurality of public listening users and added to the music library associated with one of the plurality of public listening users.

Figure 13:
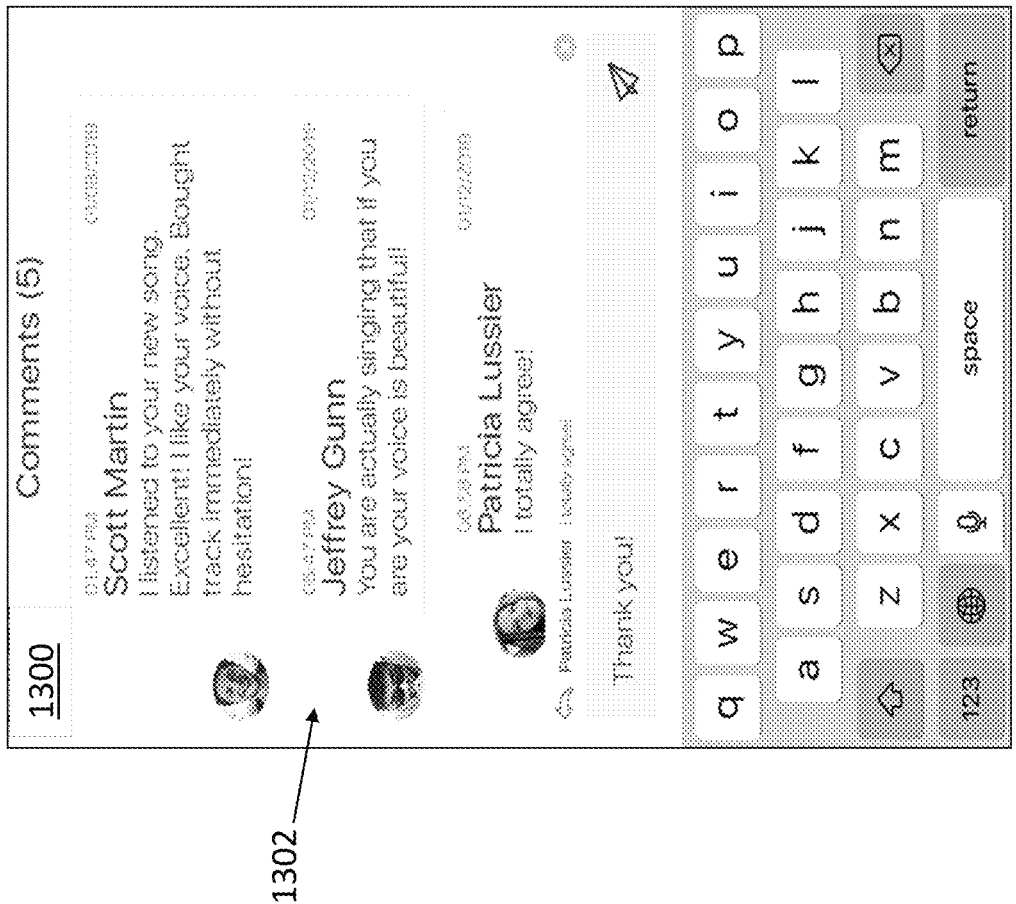
FIG. 13 is a screen shot view of a messaging screen, in accordance with the present invention.

Looking now at FIG. 13, a Step 342 of transmitting, by the plurality of public listening users, a message to the track producing user, the first recording artist user, and the second recording artist user, the message being pertinent to the unique musical composition. The UI displays a message screen 1300 that any of the users 108, 112, 116, 120 can be used for this messaging means. The public listening users 116 may transmit a message 1302 that compliments, critiques, or advises the recording artist user 112, 120 and/or the track producing user 108 about the musical composition 126. A Step 344 includes responding, by the track producing user, or the first recording artist user, or both, to the message. The recording artist user 112, 120 and/or the track producing user 108 can transmit a response message 1306 to respond accordingly.

Figure 14:
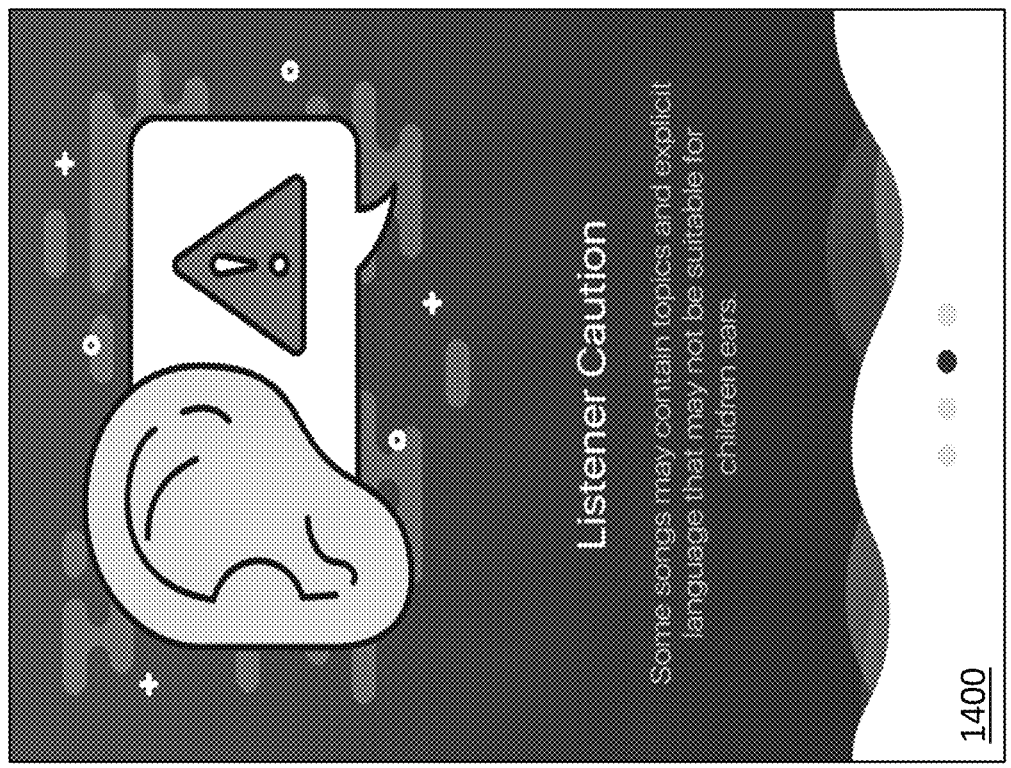
FIG. 14 is a screen shot view of a warning dialogue box 1400, in accordance with the present invention.

A final Step 346 includes warning the plurality of public listening users about a controversial element of the accessed audial link. The method 300 helps protect younger and more sensitive public listening users 116 through sue of a warning dialogue box 1400 that automatically displays to indicate that a selected musical composition may be offensive in nature (FIG. 14). For example, "Some songs may contain topics and explicit language that may not be suitable for children's ears.

In an alternative embodiment of the present invention referenced in FIGS. 15-26, a multi-user software-implemented text collaboration method and system 1500 is operable with a written text medium, such as books, texts, magazines, and digital text material. Similar to the musical composition embodiment of the system 100 and method 300, the text collaboration method and system 1500, allows an editor user, at least one author user 1502, and a plurality of public reading users 2200 to produce, collaborate, and consume unique written compositions with no fees and costs. As with the music embodiment of the invention, the text medium is stored on a network and accessible through an electronic device software app.

Figure 15:
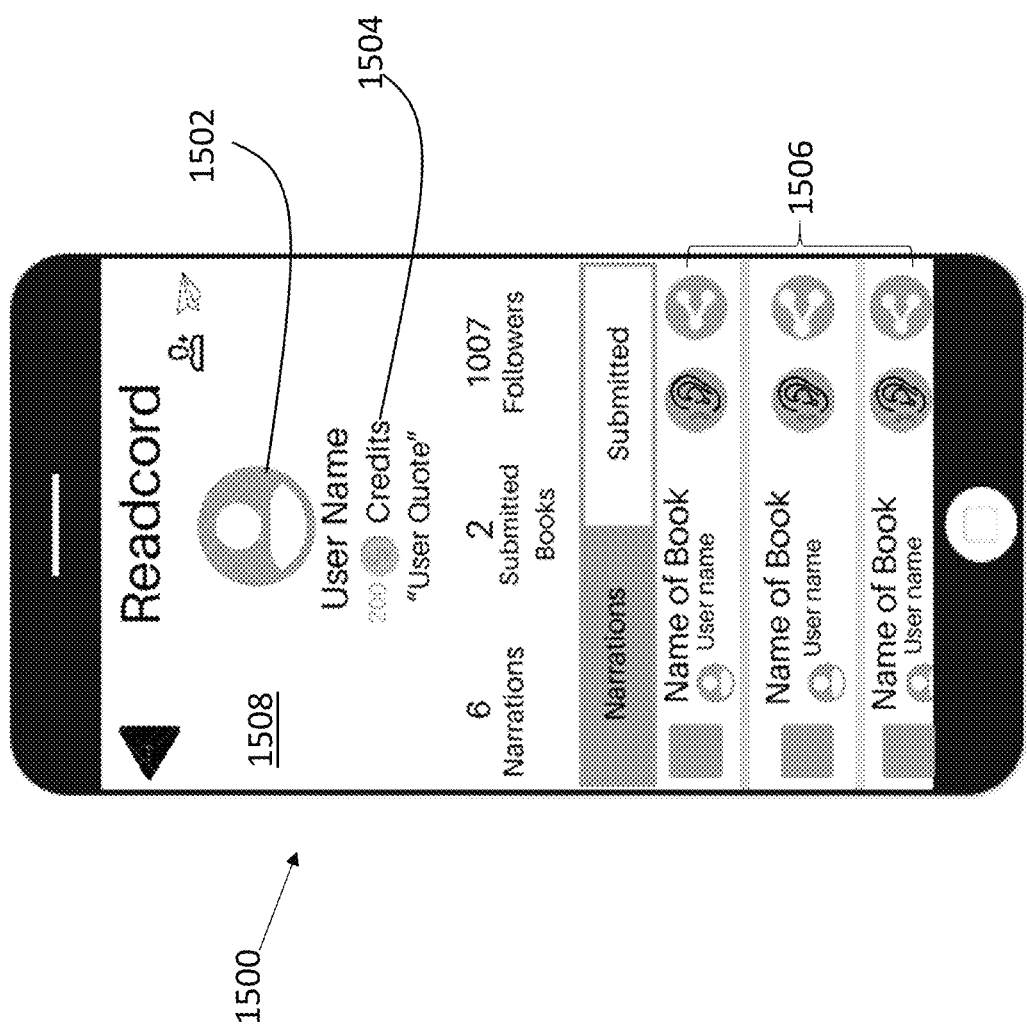
FIG. 15 is a screen shot view for a multi-user software-implemented text collaboration method and system operable with a text medium, showing a profile page, in accordance with the present invention.

The system is operable on an electronic device 1502, such as a smart phone, laptop, tablet, audio recorder, and the like. FIG. 15 shows a user profile page 1508 accessible by the author user 1502. The author user 1502 may type or record a voice to generate text for the reading medium. The recording system 1500 includes voice software that translates the recorded voice to text medium. The author user 1502 accumulates book creator credits 1504, which are visible from the profile screen. From the profile page 1508, a book list 1506 displays the books that the author user 1502 has authored through the system 1500.

Figure 16:
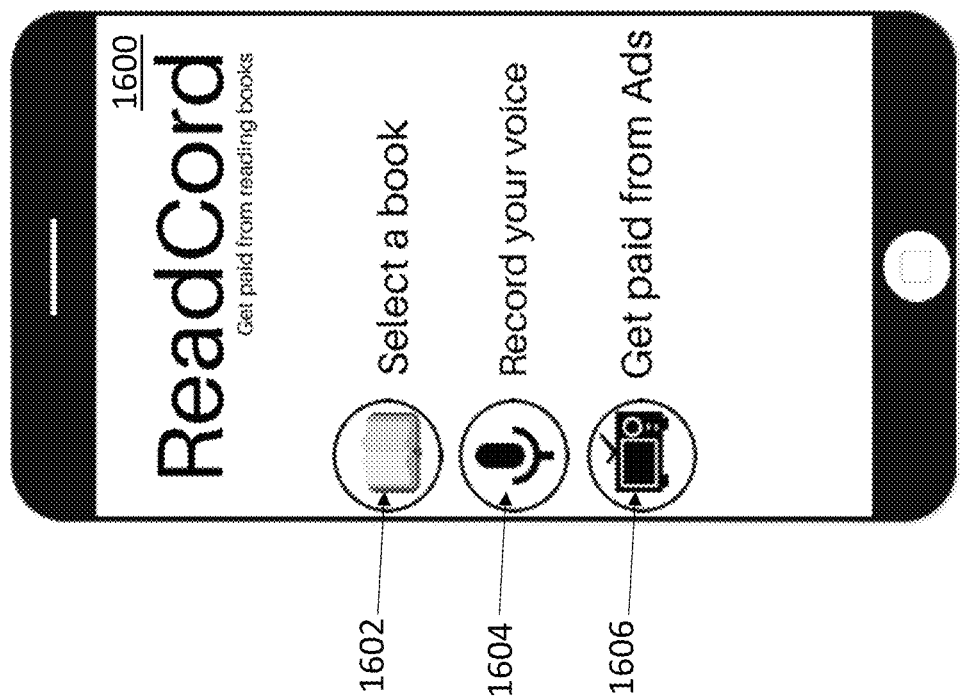
FIG. 16 is a screen shot view for a multi-user software-implemented text collaboration method and system operable with a text medium, showing a recording page, in accordance with the present invention.

The text collaboration method and system 1500 allows the editor user and author user 1502 to collaborate on the production of a unique written composition, and then store the written composition as a working digital audio file on an administrator server. The author user 1502 generates the original content, and the editor user reviews, edits, and gives feedback to the author user 1502. As FIG. 16 shows, a recording page 1600 provides the author user 1502 with the option of recording the text medium. A book selection portion 1602 can be selected to view the list of books available on the network. A voice recording portion or icon 1604 allows the author user 1502 to record the voice to generate the text medium. A bank option 1606 allows the author user 1502 to review and receive book creator credits 1504.

Figure 17:
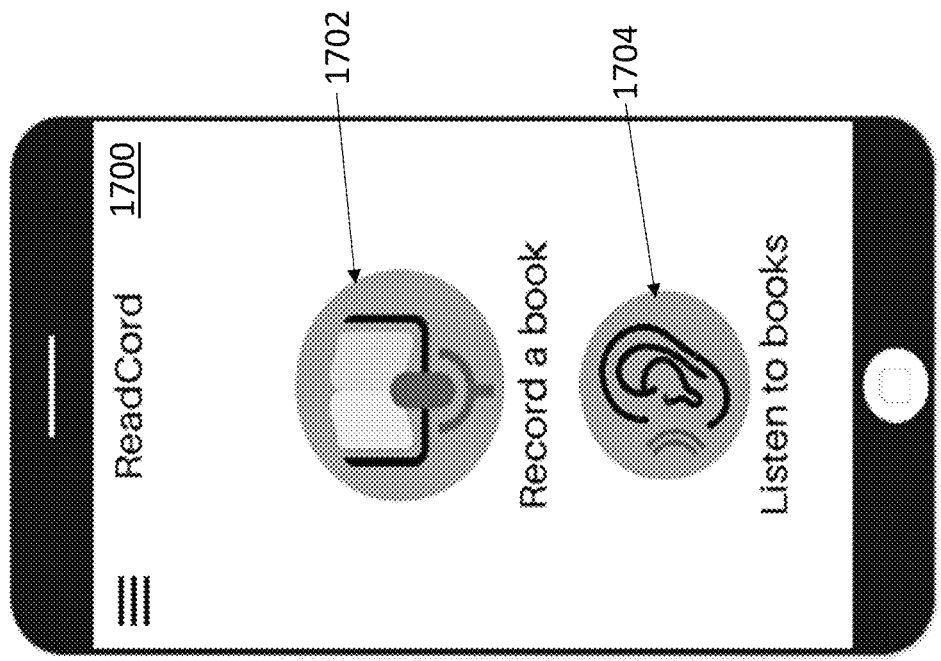
FIG. 17 is a screen shot view for a multi-user software-implemented text collaboration method and system operable with a text medium, showing a listen/read option page, in accordance with the present invention.
Figure 18:
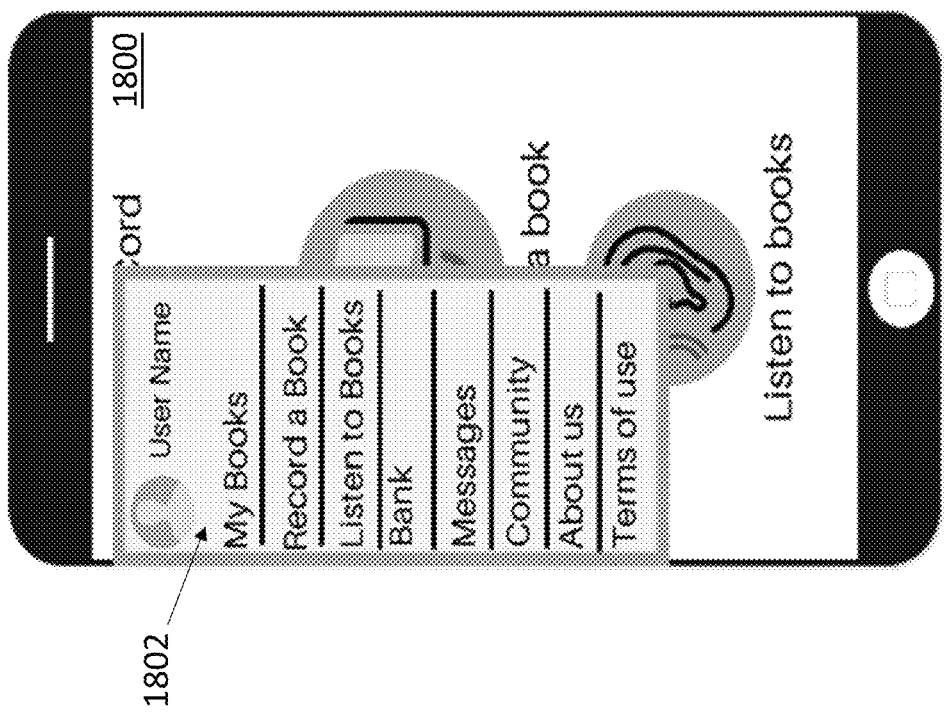
FIG. 18 is a screen shot view for a multi-user software-implemented text collaboration method and system operable with a text medium, showing a record voice page, in accordance with the present invention.

After selecting the voice recording portion 1604, a listen/read option page 1700 allow the author user 1502 to depress a record portion 1702 that provides the option to read or listen to the text medium. The record portion 1702 allow the users to begin recording the voice, which translates to the text (FIG. 17). The system 1500 comprises voice software that translates the recorded voice to text medium. A listen to book button 1704 allows the users to listen to the recorded book. Also, from the record voice page 1800 is a function option portion 1802, that includes: My Books; Record a Book; Listen to Books; Bank; Messages; Community; About Us; and Terms (FIG. 18).

Figure 19:
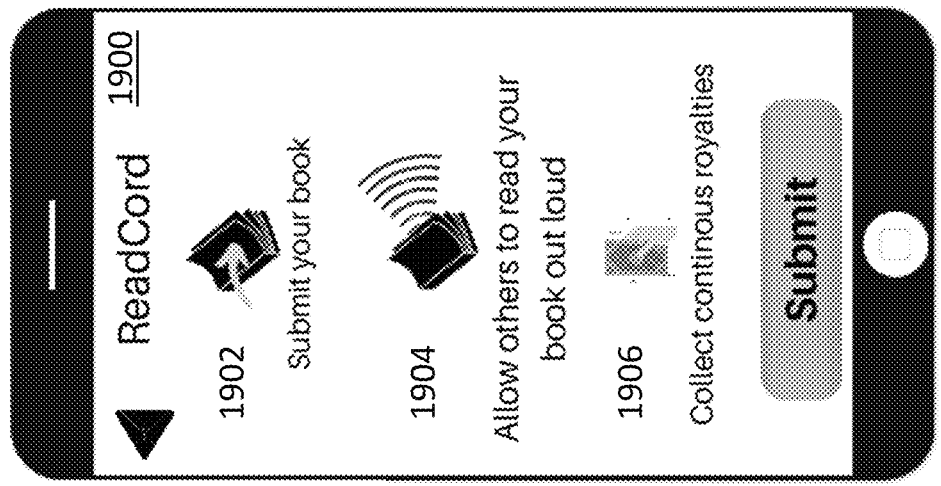
FIG. 19 is a screen shot view for a multi-user software-implemented text collaboration method and system operable with a text medium, showing an author page, in accordance with the present invention.
Figure 20:
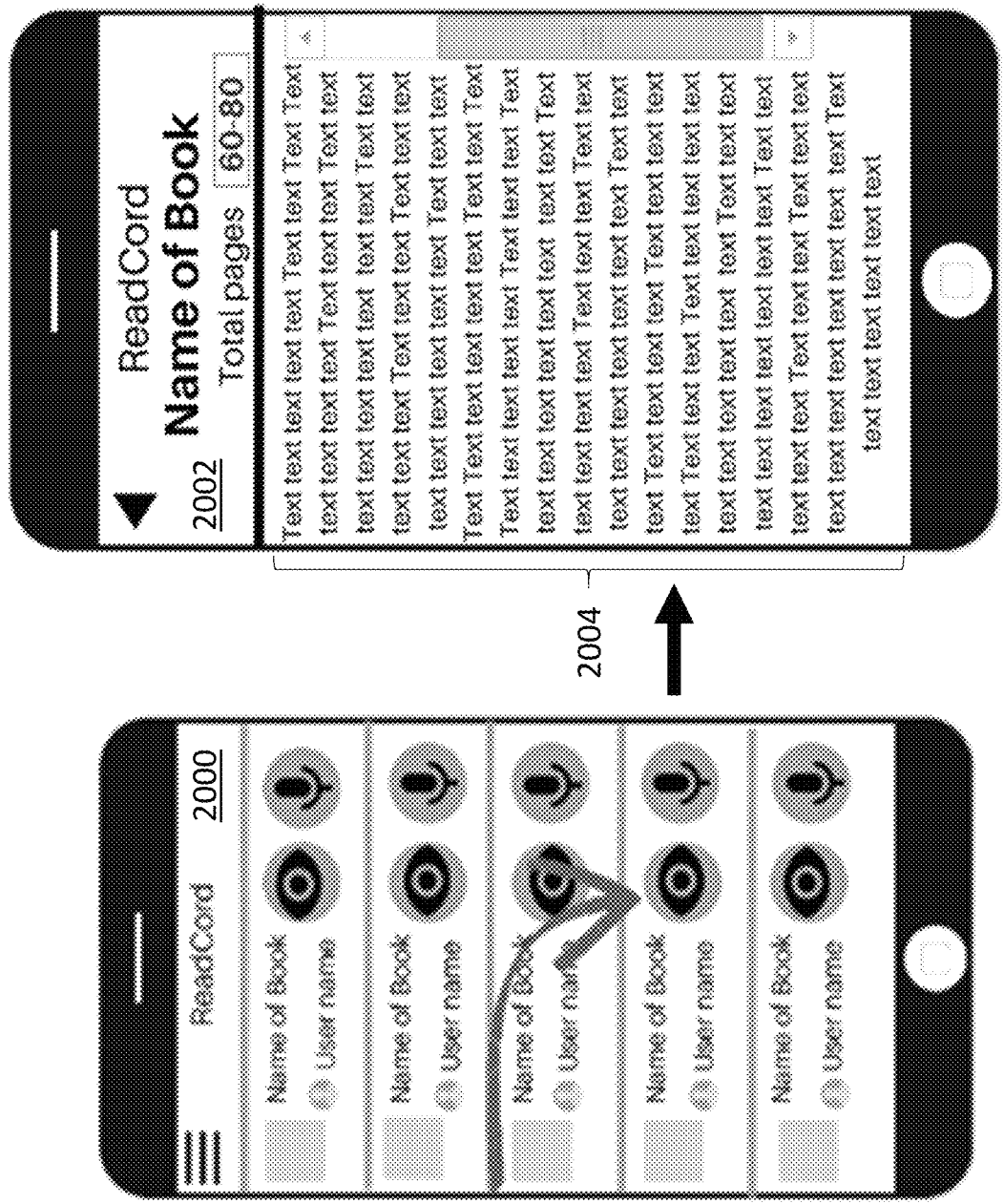
FIG. 20 is a screen shot view for a multi-user software-implemented text collaboration method and system operable with a text medium, showing a book list page, in accordance with the present invention.
Figure 22:
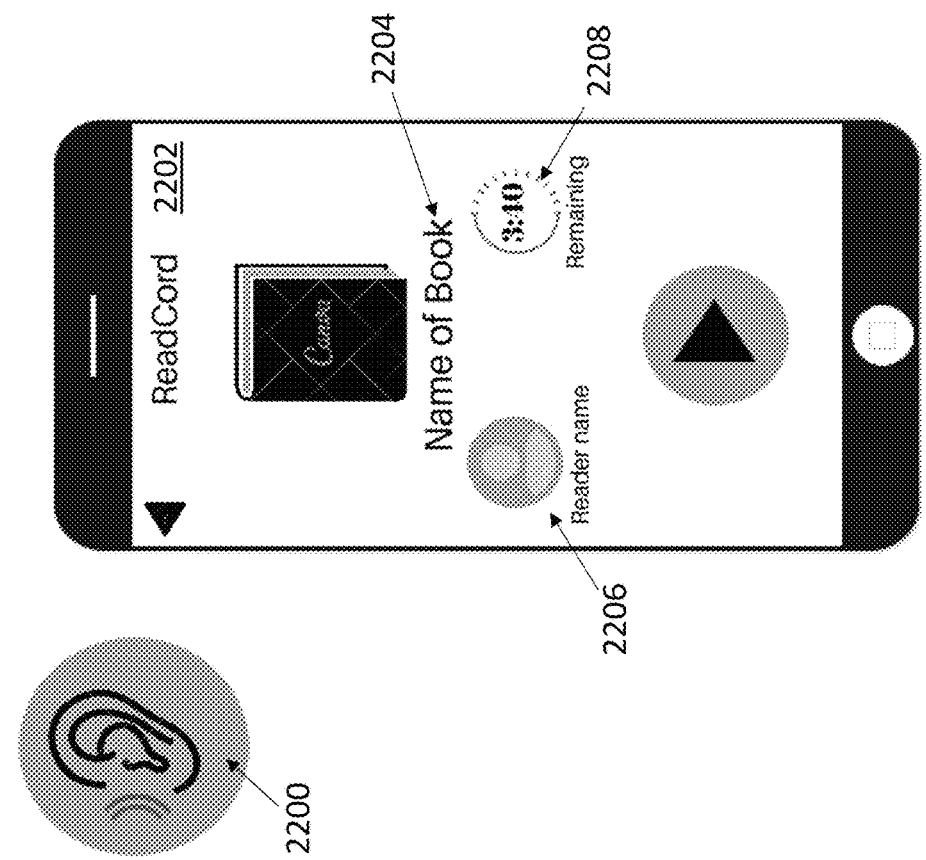
FIG. 22 is a screen shot view for a multi-user software-implemented text collaboration method and system operable with a text medium, showing a listening page, in accordance with the present invention.

FIG. 19 references an author page 1900, where the author user 1502 can record the text medium and translate to text medium through a text recording portion 1902, and also download a voice recording through a release recording portion 1904 that releases the recorded voice and text medium for the public reading users to read. From the author page, the author user 1502 can also collect creator credits through a royalty portion 1906. As FIG. 20 shows, a book list page 2000 can be engaged to provide the option of viewing the text medium or recording the voice. When viewing, a text medium portion 2002 of the book list page 2000 displays the text 2004 of the text medium.

Figure 21:
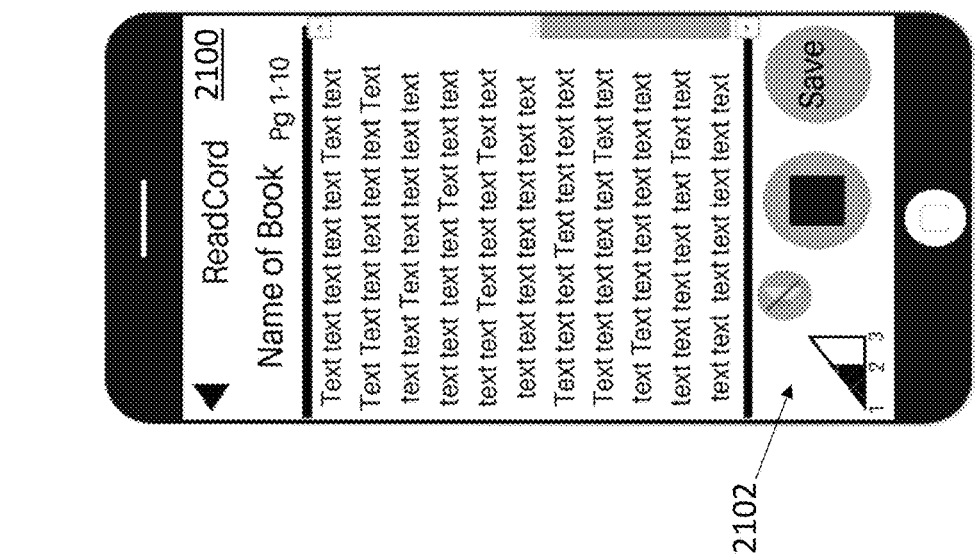
FIG. 21 is a screen shot view for a multi-user software-implemented text collaboration method and system operable with a text medium, showing a reading page, in accordance with the present invention.

Turning now to FIG. 21, the public reading users 2200 can selectively view or listen to the text medium from a reading page 2100. A voice and power portion 2102 allows the public reading users 2200 to adjust volume, check power status, and mute the recording. A listening page 2202 is accessible by the public reading users 2200 to listen to the recording of the text medium. This may include the voice of the author user 1502, or another voice. The listening page 2202 allows the public reading users 2200 to control listening the text medium. The listening page 2202 includes a book title portion 2204 that displays the title of the text medium. A reader name portion 2206 displays the public reading users 2200. A time portion 2208 displays the amount of time remaining to complete the recording.

The method also allows public reading users to consume the written text for free by viewing a third-party advertisement to accumulate viewing credits 2302 from a reading users credit page 2300 (FIG. 23). The public reading users 2200 convert the viewing credits 2302 to access the text composition for storage in a personal book library. The editor user and the author user receive a creator credit 1504 when the public reading users 2200 stores the text composition in the book library. From the reading users credit page 2300, the public reading users 2200 can control the audio and text flow, along with forward and rewind functions, through an audio portion 2304.

In one payment arrangement, both the author user and the public reading users receive a creator credit 1504, such as $0.10 for every text composition added to the user's book library. Further, the authors have the ability to collect continuous narration royalties from numerous public reading users when the book pages are added to user book libraries. Furthermore, another unique feature is that two or more public reading users can collaborate on segmented portions of the text (book with characters i.e. Harry Potter, for example).

FIG. 24 references a payment vehicle page 2400 that requests a payment means to award the creator credit 1504 to the accounts of the author user. A payment vehicle sign-in portion 2402 allows the users to accommodate this request by signing in to the payment vehicle. In one non-limiting embodiment, the payment vehicle may include PayPal™, or other online payment systems that support online money transfers and service. In one non-limiting embodiment, the payment vehicle may include PayPal™, or other online payment systems that support online money transfers and service.

Figure 26:
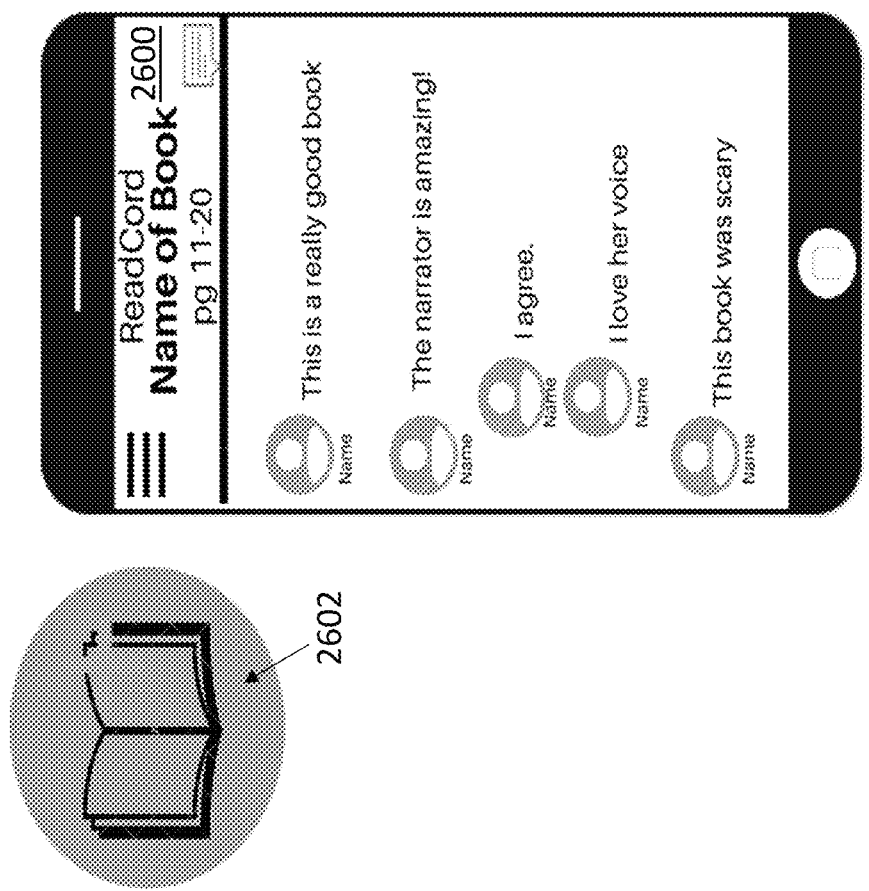
FIG. 26 is a screen shot view for a multi-user software-implemented text collaboration method and system operable with a text medium, showing a message page, in accordance with the present invention.
Figure 25:
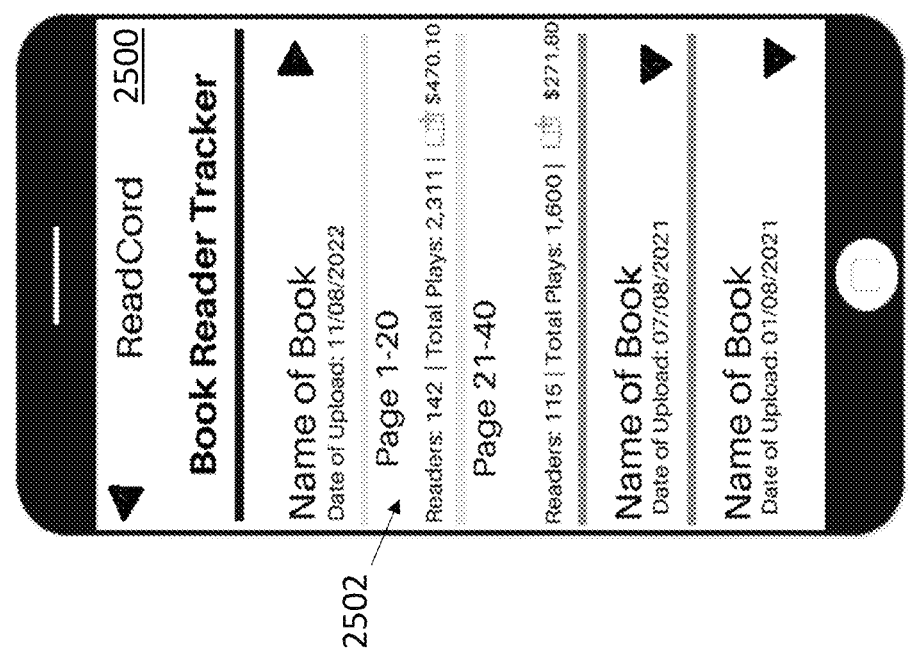
FIG. 25 is a screen shot view for a multi-user software-implemented text collaboration method and system operable with a text medium, showing a book tracker page, in accordance with the present invention.

Turning now to FIG. 25, a book tracker page 2500 allows the public reading users 2200 to keep track of which section of the text medium has been read, and which section is remaining. The book tracker page 2500 includes a tracking portion 2502 that lists the title of the book, the page of the book that has been reached, and the remaining portion to be read or listened. Turning now to FIG. 26 references, all the users may communicate with each other through a message 2602 to comment, critique, and encourage each other from a message page 2600. The public reading users can transmit the message 2602 to the author user 1502. The message is pertinent to the text composition. The public reading users 2200 may transmit a message 1302 that compliments, critiques, or advises the author user 1502 about the text composition.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

What is claimed is:

1. A multi-user software-implemented musical collaboration method comprising the steps of:
providing an administrator server with a memory, the server communicatively coupled to a music collaboration network;
providing an electronic device of a track producing user communicatively coupled to the server over the music collaboration network;
providing an electronic recording device of a first recording artist user communicatively coupled to the server over the music collaboration network and having an audio input, the first recording artist user geographically displaced with respect to the track producing user;
providing an electronic device of a plurality of public listening users communicatively coupled to the server over the music collaboration network;
receiving and storing, at and on the memory of the administrator server, a working digital audio file of a unique musical composition from the electronic device of the track producing user and recorded by the track producing user, the working digital audio file of a plurality of digital audio files resident on the memory of the administrator server;
assigning the working digital audio file with a unique audio file tag and associating the unique audio file tag with an account of the track producing user;
receiving and storing, at and on the memory of the administrator server, the working digital audio file with a first digital audio overlay from the first recording artist user to generate a collaboration working digital audio file, the first digital audio overlay of unique articulate vocals received by the audio input of, and recorded by, the electronic recording device of the first recording artist user;
assigning the working digital audio file with the first digital audio overlay to the unique audio file tag and associating the unique audio file tag with an account of the first recording artist user, the accounts of the first recording artist user track and the producing user communicatively coupled over the music collaboration network that is selectively closed;
publishing, over the music collaboration network and on a user interface publicly available and accessible by the plurality of public listening users, an audial link to the collaboration working digital audio file;
requiring the plurality of public listening users to login into a public user account and to view a third-party advertisement;
providing, after login into the public user account, at least one viewing credit to at least one of the plurality of public listening users after viewing the third-party advertisement, wherein a pre-set accumulation of the at least one viewing credit enables the at least one of the plurality of public listening users to access the audial link to the collaboration working digital audio file and add and store the collaboration working digital audio file to a music library associated with the at least one of the plurality of public listening users; and
assigning a creator credit directly to the accounts of both the track producing user and the first recording artist user for deposit into a third-party deposit account communicatively linked to the accounts of the track producing user, the first recording artist over the selectively closed network and when the audial link to the collaboration working digital audio file is accessed by one of the plurality of public listening users having sufficient of the pre-set accumulation of the at least one viewing credit and added to the music library associated with one of the plurality of public listening users, the accounts of the track producing user, the first recording artist, and the plurality of public listening users all resident on the memory of the administrator server.

2. The multi-user software-implemented musical collaboration method according to claim 1, further comprising:
requiring the plurality of public listening users to view a substantial portion of the third-party advertisement as a requirement to receive the at least one viewing credit.

3. The multi-user software-implemented musical collaboration method according to claim 1, wherein:
the creator credit is assigned autonomously to the accounts of the track producing user and the first recording artist user.

4. The multi-user software-implemented musical collaboration method according to claim 3, further comprising:
associating a payment vehicle to the track producing user and the first recording artist user, whereby the creator credit is autonomously assigned to the accounts of the track producing user and the first recording artist user through the payment vehicle.

5. The multi-user software-implemented musical collaboration method according to claim 4, further comprising:
providing a vocal filtering user interface on the electronic recording device of the first recording artist user, the vocal filtering user interface operably configured to enable a voice filtering program to modulate the first digital audio overlay from the first recording artist user.

6. The multi-user software-implemented musical collaboration method according to claim 1, further comprising:
providing an electronic recording device of a second recording artist user, different than the first recording artist user, communicatively coupled to the server over the music collaboration network and having an audio input, the second recording artist user geographically displaced with respect to the track producing user and the first recording artist user;
receiving and storing, at and on the memory of the administrator server, the collaboration working digital audio file with a second digital audio overlay from the second recording artist user, the second digital audio overlay of unique articulate vocals received by the audio input of, and recorded by, the electronic recording device of the second recording artist user;
assigning the working digital audio file with the first and second digital audio overlays to the unique audio file tag and associating the unique audio file tag with an account of the second recording artist user; and
assigning the creator credit to the accounts of the track producing user, the first recording artist user, and the first recording artist user.

7. The multi-user software-implemented musical collaboration method according to claim 1, wherein:
the unique musical composition is an instrumental without lyrics or singing.

8. The multi-user software-implemented musical collaboration method according to claim 1, further comprising:
requiring the track producing user and first recording artist user to login into a password-protected account, thereby creating a selectively closed music collaboration network.

9. The multi-user software-implemented musical collaboration method according to claim 1, further comprising:
transmitting, by the plurality of public listening users, a message to the track producing user, or the first recording artist user, or both, the message being pertinent to the unique musical composition.

10. The multi-user software-implemented musical collaboration method according to claim 1, further comprising:
responding, by the track producing user, or the first recording artist user, or both, to the message.

11. The multi-user software-implemented musical collaboration method according to claim 1, further comprising:
warning the plurality of public listening users about a controversial element of the accessed audial link.

12. The multi-user software-implemented musical collaboration method according to claim 1, further comprising:
displaying, by a third-party advertiser, the third-party advertisement to the plurality of public listening users.

13. The multi-user software-implemented musical collaboration method according to claim 12, further comprising:
assigning, by the third-party advertiser, the creator credit to the accounts of the track producing user and the first recording artist user when the audial link to the collaboration working digital audio file is accessed by one of the plurality of public listening users and added to the music library associated with one of the plurality of public listening users.

14. A multi-user software-implemented musical collaboration method comprising the steps of:
providing an administrator server with a memory, the server communicatively coupled to a music collaboration network;
providing an electronic device of a track producing user communicatively coupled to the server over the music collaboration network;
providing an electronic recording device of a first recording artist user communicatively coupled to the server over the music collaboration network and having an audio input, the first recording artist user geographically displaced with respect to the track producing user;
providing an electronic device of a plurality of public listening users communicatively coupled to the server over the music collaboration network;
receiving and storing, at and on the memory of the administrator server, a working digital audio file of a unique musical composition from the electronic device of the track producing user and recorded by the track producing user, the working digital audio file of a plurality of digital audio files resident on the memory of the administrator server;
assigning the working digital audio file with a unique audio file tag and associating the unique audio file tag with an account of the track producing user;
receiving and storing, at and on the memory of the administrator server, the working digital audio file with a first digital audio overlay from the first recording artist user to generate a collaboration working digital audio file, the first digital audio overlay of unique articulate vocals received by the audio input of, and recorded by, the electronic recording device of the first recording artist user;
assigning the working digital audio file with the first digital audio overlay to the unique audio file tag and associating the unique audio file tag with an account of the first recording artist user;
publishing, over the music collaboration network and on a user interface publicly available and accessible by the plurality of public listening users, an audial link to the collaboration working digital audio file;
assigning a creator credit to the accounts of the track producing user and the first recording artist user when the audial link to the collaboration working digital audio file is accessed by one of the plurality of public listening users having sufficient of the pre-set accumulation of the at least one viewing credit and added to a music library associated with one of the plurality of public listening users;
requiring the plurality of public listening users to login into a public user account and providing, after login into the public user account and viewing a third-party advertisement through an auditory mechanism or video, at least one viewing credit to at least one of the plurality of public listening users, wherein a pre-set accumulation of the at least one viewing credit enables the at least one of the plurality of public listening users to access the audial link to the collaboration working digital audio file and add and store the collaboration working digital audio file to the music library associated with the at least one of the plurality of public listening users;

providing an electronic recording device of a second recording artist user, different than the first recording artist user, communicatively coupled to the server over the music collaboration network and having an audio input, the second recording artist user geographically displaced with respect to the track producing user and the first recording artist user;

receiving and storing, at and on the memory of the administrator server, the collaboration working digital audio file with a second digital audio overlay from the second recording artist user, the second digital audio overlay of unique articulate vocals received by the audio input of, and recorded by, the electronic recording device of the second recording artist user;

assigning the working digital audio file with the first and second digital audio overlays to the unique audio file tag and associating the unique audio file tag with an account of the second recording artist user;

assigning the creator credit directly to the accounts of the track producing user, the first recording artist user, and the second recording artist user for deposit into a third-party deposit account communicatively linked to the accounts of the track producing user, the first recording artist, and the second recording artist, the track producing user, the first recording artist, and the second recording artist all communicatively coupled together over the music collaboration network that is selectively closed, the accounts of the track producing user, the first recording artist, the second recording artist, and the plurality of public listening users all resident on the memory of the administrator server; and transmitting, by the plurality of public listening users, a message to the track producing user, the first recording artist user, and the second recording artist user, the message being pertinent to the unique musical composition.

15. The multi-user software-implemented musical collaboration method according to claim 14, further comprising:
warning the plurality of public listening users about a controversial element of the accessed audial link.

16. The multi-user software-implemented musical collaboration method according to claim 14, further comprising:
displaying, by a third-party advertiser, the third-party advertisement to the plurality of public listening users, the third-party advertiser assigning the creator credit to the accounts of the track producing user, the first recording artist user, and the second recording artist user.

* * * * *